United States Patent
Guner et al.

(10) Patent No.: US 12,299,846 B2
(45) Date of Patent: May 13, 2025

(54) ARTIFACT REMOVAL FROM BOREHOLE IMAGES USING MACHINE LEARNING

(71) Applicant: Halliburton Energy Services, Inc., Houston, TX (US)

(72) Inventors: Baris Guner, Houston, TX (US); Ahmed E. Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 389 days.

(21) Appl. No.: 17/678,832

(22) Filed: Feb. 23, 2022

(65) Prior Publication Data
US 2023/0245278 A1    Aug. 3, 2023

Related U.S. Application Data

(60) Provisional application No. 63/305,018, filed on Jan. 31, 2022.

(51) Int. Cl.
| | |
|---|---|
| G06K 9/00 | (2022.01) |
| E21B 47/002 | (2012.01) |
| G06T 5/70 | (2024.01) |
| G06T 5/77 | (2024.01) |

(52) U.S. Cl.
CPC ............ *G06T 5/70* (2024.01); *E21B 47/0025* (2020.05); *G06T 5/77* (2024.01); *G06T 2207/20081* (2013.01); *G06T 2207/20084* (2013.01)

(58) Field of Classification Search
CPC .................. E21B 2200/22; E21B 47/0025
See application file for complete search history.

(56) References Cited

U.S. PATENT DOCUMENTS

| | | | |
|---|---|---|---|
| 10,635,943 B1* | 4/2020 | Lebel | G06T 5/50 |
| 11,216,926 B2 | 1/2022 | Guner et al. | |
| 2015/0260874 A1 | 9/2015 | Chen et al. | |
| 2017/0342826 A1 | 11/2017 | Wilson et al. | |
| 2018/0106763 A1 | 4/2018 | Fouda et al. | |
| 2018/0106764 A1 | 4/2018 | Fouda et al. | |
| 2019/0064388 A1* | 2/2019 | Mickael | G01V 5/12 |
| 2019/0078430 A1 | 3/2019 | Fouda et al. | |
| 2019/0086320 A1 | 3/2019 | Guner et al. | |
| 2019/0087939 A1 | 3/2019 | Hakimuddin | |
| 2019/0203580 A1 | 7/2019 | Guner et al. | |
| 2020/0065940 A1* | 2/2020 | Tang | G06T 3/40 |
| 2020/0182830 A1 | 6/2020 | Fouda et al. | |
| 2020/0309986 A1 | 10/2020 | Donderici et al. | |
| 2020/0333500 A1 | 10/2020 | Fouda et al. | |

(Continued)

OTHER PUBLICATIONS

Lim, et al., "Enhanced Deep Residual Networks for Single Image Super-Resolution", Cornell University, arXiv, Jul. 10, 2017.

(Continued)

*Primary Examiner* — Hadi Akhavannik
(74) *Attorney, Agent, or Firm* — John Wustenberg; C. Tumey Law Group PLLC

(57) ABSTRACT

A method for correcting borehole images may include acquiring a raw data image of a formation using a downhole tool that takes one or more measurements and processing the raw data image through a machine learning model to form a corrected image. The method may further include displaying the corrected image and identifying one or more formation properties based at least in part on the corrected image.

20 Claims, 12 Drawing Sheets

(56) References Cited

U.S. PATENT DOCUMENTS

| | | | |
|---|---|---|---|
| 2021/0048554 A1 | 2/2021 | Guner et al. | |
| 2021/0088686 A1* | 3/2021 | Samson | G06N 20/00 |
| 2021/0124081 A1 | 4/2021 | Donderici et al. | |
| 2021/0224964 A1* | 7/2021 | Narukiyo | G06T 5/73 |
| 2021/0225047 A1* | 7/2021 | Pawar | A61B 5/7207 |
| 2021/0256671 A1 | 8/2021 | Guner et al. | |
| 2021/0301655 A1 | 9/2021 | Ranganathan et al. | |
| 2021/0304386 A1 | 9/2021 | Guner et al. | |
| 2021/0340860 A1* | 11/2021 | Guner | E21B 47/0228 |
| 2021/0396903 A1 | 12/2021 | Bayraktar et al. | |

OTHER PUBLICATIONS

Xie, et al., "Artifact Removal using Improved GoogLeNet for Sparse-view CT Reconstruction", Scientific Reports, Nov. 2017.
Weigend, "On Overfitting and the Effective Number of Hidden Units ; CU-CS-674-93", University of Colorado Boulder, Sep. 1993.
Schlumberger, Dielectric Scanner, 2013.
Schlumberger, Quanta Geo, 2019.
Baker Hughes, Array Dielectric explorer formation evaluation service, 2019.
Baker Hughes, GeoXplorer imaging service, Accessed Feb. 2022, Available at https://www.bakerhughes.com/evaluation/wireline-openhole-logging/wireline-imaging/geoxplorer-imaging-service.
Halliburton, StrataXaminer Imaging Service, H013996, Jun. 2021.
Halliburton, Omri, Oil Mud Reservoir Imager Tool, Accessed Feb. 2022, Available at https://hesp.com/index.php/services/open-hole/imaging/omri-ia-logiq-oil-based-mud-reservoir-imager.
International Search Report and Written Opinion for Application No. PCT/US2022/018734, dated Oct. 24, 2022.

* cited by examiner

ARTIFACT REMOVAL FROM BOREHOLE IMAGES USING MACHINE LEARNING

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. Borehole imager tools may be used to determine formation stratigraphy, dips of the formation layers as well as, borehole and formation stress. During drilling operations borehole imager tools may be particularly important in learning about thin beds, fracture locations, and low resistivity formations. To detect thin beds, fracture locations, and low resistivity formations borehole imager may transmit a current through an injector electrode into the formation. A return electrode may record the current after the current has passed through the formation. Measuring this current may allow an operator to determine characteristic and properties of thin beds, fracture locations, and low resistivity formations. Generally, these measurements may be displayed as an image.

Images obtained by downhole tools may contain artifacts that degrade the image quality. The causes of these artifacts may include tool and environmental noise, limitations of the calibration, current leakage through the tool body, mismatches between borehole and tool curvatures (geometric factor effect,) tool eccentricity and pad to pad offsets. Existing techniques to reduce the artifacts may be based on traditional signal processing methods. These methods may employ statistical averaging techniques to determine the anomalies in data and correct for them. These statistical averages may be calculated from a window within the data (i.e., a depth interval if the data is recorded with depth as a reference.) Thus, if the data is noisy within that interval, it may lead to inaccuracies in the resulting corrections. Furthermore, if the data needs to be corrected in real time, there may be a significant delay from the data acquisition to the display of the processed data (depending on window size.) These traditional techniques may also involve some parameters that need to be tuned by an operator. Thus, they are prone to operator errors and inconsistencies across different users.

BRIEF DESCRIPTION OF THE DRAWINGS

For a detailed description of the examples of the disclosure, reference will now be made to the accompanying drawings in which.

DETAILED DESCRIPTION

The present disclosure discloses a system and method for a machine learning technique to denoise and remove artifacts from borehole images. Specifically, training a regression function obtained by a machine learning algorithm where the input is a small image of noisy data and target is the corresponding data that has been corrected (or a correction that needs to be applied to the original data.) For training the machine learning algorithm, either synthetic data, data from sections with high image quality or data processed with existing processing algorithms (selected from sections with high image quality after processing) may be used. Artificial noise may be added to data to create the noisy image or to accentuate and diversify the artifacts in the noisy image for the input dataset. Systems and methods described below may introduce almost no delays once the model is trained and thus, it may be used in real time correction of the borehole images.

Figure 1:
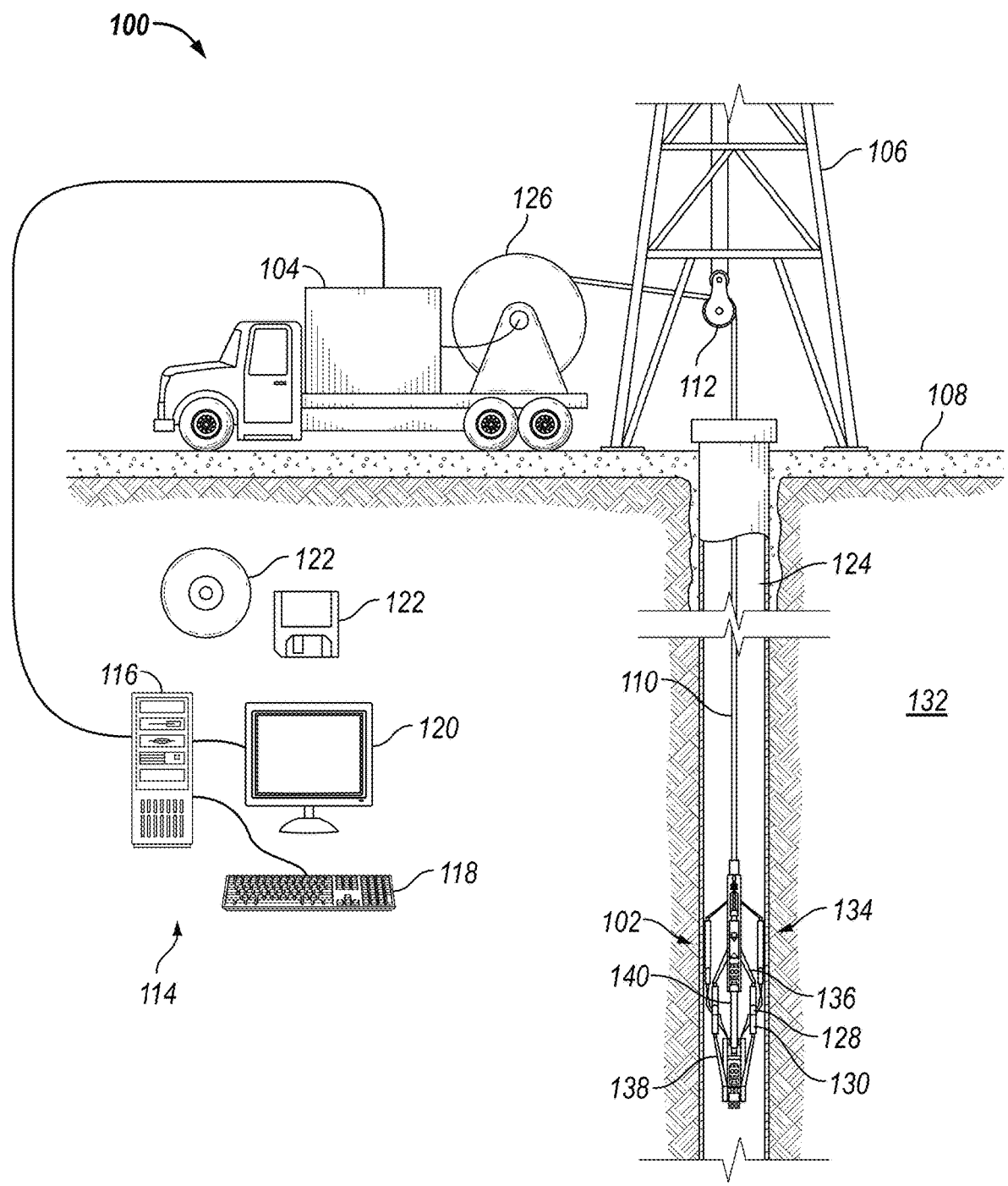
FIG. 1 illustrates an example of a well measurement system.

FIG. 1 illustrates a cross-sectional view of an example of a well measurement system 100. As illustrated, well measurement system 100 may include downhole tool 102 attached to a vehicle 104. As discussed below, downhole tool 102 may be a resistivity imager, impedance imager, and/or the like. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102.

Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102.

Conveyance 110 may lower downhole tool 102 in borehole 124. Generally, borehole 124 may include horizontal, vertical, slanted, curved, and other types of borehole geometries and orientations. Imaging tools may be used in uncased sections of the borehole. Measurements may be made by downhole tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high-resolution resistivity image of formation 132 immediately surrounding borehole 124. Description of resistivity imagers, in particular oil-based resistivity imagers, are provided as an example implementation of the methods described herein. However, the described methods are equally applicable to borehole images obtained via other means such as acoustic imagers or density imagers. The high-resolution resistivity image may depict boundaries of subsurface structures, such as a plurality of layers disposed in formation 132. These formation images may be used in reservoir characterization. Formation images with high resolution may allow accurate identification of thin beds and other fine features such as fractures, clasts and vugs. These formation images may provide information about the sedimentology, lithology, porosity and permeability of formation 132. The formation images may complement, or in some cases replace, the process of coring.

Downhole tool 102 may include a plurality of electrodes, such as button array 128. Downhole tool 102 may also include a return electrode 130. It should be noted that the plurality of electrodes disposed on button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may include both button array 128 and return electrodes 130. Pads 134 may attach to a mandrel 140 of downhole tool 102 through upper arm 136 and lower arm 138. It should be noted that mandrel 140 may be defined as the supporting structure of downhole tool 102 which may act as a platform for any peripheral (e.g., upper arm 136, lower arm 138, conveyance 110, etc.) to attach to downhole tool 102. Upper arm 136 and lower arm 138 may extend pad 134 away from downhole tool 102. In examples, both upper arm 136 and lower arm 138 may place pad 134 in contact with borehole 124. It should be noted that there may be any suitable number of arms and/or extensions that may be used to move pad 134 away from downhole tool 102 and in close proximity with borehole 124, or vice versa.

During operations, an operator may energize an individual electrode, or any number of electrodes, of button array 128. A voltage may be applied between the electrode of button array 128 and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 128. Therefore, current emitted by each electrode may be measured and recorded in order to obtain a formation image of the resistivity of formation 132.

To produce a resistivity image of formation 132, a current may be emitted from at least one electrode from button array 128 and return to return electrode 130. In examples, current may be emitted from any transmission type electrode along downhole tool 102. Injector elected 204 and return electrode 130 may be referred to as the current electrodes. Then, the voltage drop across a pair of the electrodes of button array 128 may be measured and used to estimate the impedance of formation 132. In these alternative implementations, button electrodes may be referred to as voltage electrodes, button electrodes, or monitor electrodes. As previously mentioned, proposed method may operate in any of the two designs of oil-based mud resistivity imagers above or any other similar borehole imager tools including other oil-based mud resistivity imager tool designs, water-based mud resistivity imager tools, acoustic imagers and density imagers without any limitations.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed down hole in downhole tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, which may be used to process the measurements of downhole tool 102 before they may be transmitted to surface 108. Alternatively, raw measurements from downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
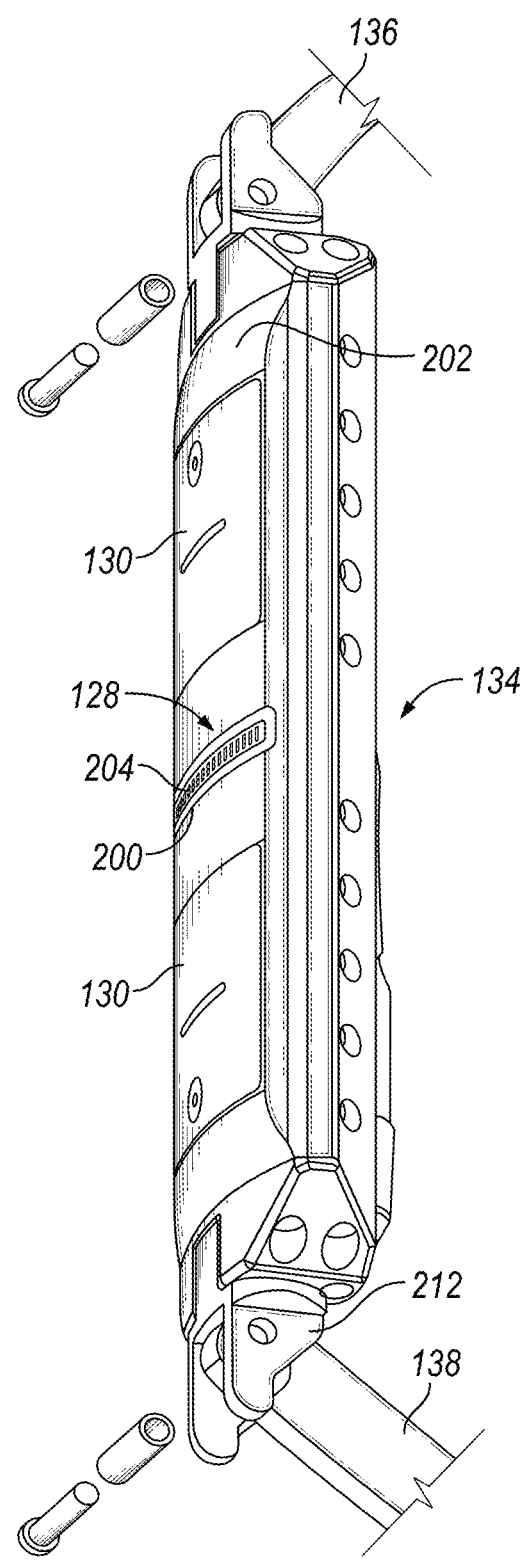
FIG. 2 illustrates an example of a pad.

FIG. 2 illustrates an example of pad 134. It should be noted that pad 134 may be connected to downhole tool 102 (e.g., referring to FIGS. 1 and 2). Pad 134 may serve to place button array 128 and/or return electrode 130 in contact with or in close proximity to borehole 124. Pad 134 may include a button array 128, a return electrode 130, a guard 200, and a housing 202. In examples, there may be a plurality of button arrays 128. In examples, return electrode 130 and button array 128 may be disposed directly on downhole tool 102. Button array 128 may include an injector electrode 204, wherein injector electrode 204 may be a sensor that senses impedance of formation 132. It should be noted that injector electrode 204 may be a button electrode. There may be any suitable number of injector electrodes 204 within button array 128 that may produce a desired, predetermined current. Without limitation, the range for a suitable number of injector electrodes 204 within button array 128 may be from about one injector electrode 204 to about one hundred injector electrodes 204. For example, the range for a suitable number of injector electrodes 204 within button array 128 may be from about one injector electrode 204 to about twenty-five injector electrodes 204, from about twenty-five injector electrodes 204 to about fifty injector electrodes 204, from about fifty injector electrodes 204 to about seventy-five injector electrodes 204, or from about seventy-five injector electrodes 204 to about one hundred injector electrodes 204.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. Without limitation, the distance from the center of one of the return electrodes to the button array may be from about one inch to about one foot. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each injector electrode 204 and return electrode 130. The level of the voltage may be controlled by information handling system 114. This may cause currents to be transmitted through button array 128. These currents may travel through the mud and formation 132 and may reach back to return electrode 130. The amount of current emitted by each injector electrode 204 may be inversely proportional to the impedance seen by that injector electrode 204. This impedance may be affected by the properties of formation 132 and the mud directly in front of each injector electrode 204. Therefore, current emitted by each injector electrode 204 may be measured and recorded in order to obtain an image of the resistivity of formation 132.

In examples, a current may be transmitted from injector electrode 204 and return to return electrode 130. Injector elected 204 and return electrode 130 may be referred to as the current electrodes. Then, the voltage drops across button array 128 may be measured and used to estimate the impedance of formation 132. In these alternative implementations, electrodes of button array 128 may be referred to as voltage electrodes, button electrodes, or monitor electrodes. Proposed method may operate in any of the two designs of oil-based mud resistivity imager tools above, any other similar oil-based mud resistivity imager tool or another borehole imager tool such as water-based mud resistivity imager tool, acoustic imager tool or density imager tool without any limitations. In the rest of the text, the imager tool will be assumed to be of the first design without any loss of generality and the scope of the disclosure is not limited to just oil based mud resistivity imagers.

Returning back to FIG. 2, guard 200 may help to focus most of the current produced by button array 128 into formation 132 radially. Guard 200 may be disposed around button array 128. Guard 200 may include the same potential as button array 128.

In examples, housing 202 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 202 may be a metal plate. Housing 202 may be connected through upper arm 136 to downhole tool 102 (e.g., referring to FIG. 1). An insulating material may be used to fill the remaining portions of pad 134. In examples, ceramics may be used as the insulating material to fill the remaining portions of pad 134.

An impedance value may be calculated through the current transmitting between an injector electrode 204 and formation 132 for each injector electrode 204. The voltage between button array 128 and return electrodes 130 may be measured and divided by the transmitted current to produce a value for the impedance seen by each injector electrode 204. Most of the transmitted current may be returned to return electrodes 130 although some portions of it may return through housing 202 and downhole tool 102 (e.g., referring to FIG. 1).

During logging operations, measurement data taken by pad 134 may include effects of resistivity and permittivity. Measurements may contain contributions from oil-based mud that is may be disposed between pad 134 and the wall of borehole 124 as well as the signal coming from the formation.

In general, the measurement medium of pad 134 may be modeled as a homogeneous formation with a thin layer of oil-based mud between pad 134 and formation 132. When pad 134 is placed on formation 132 without a mud layer, response measurement may only be from formation 132. However, when there is a mud layer present, the response is influenced by the thickness of the mud layer as well as the mud properties, in addition to the properties of formation 132 behind the mud layer. That being said, the response for certain formations 132 predominantly consist of the mud signal, which may make this response suitable for determining mud properties.

Figure 3:
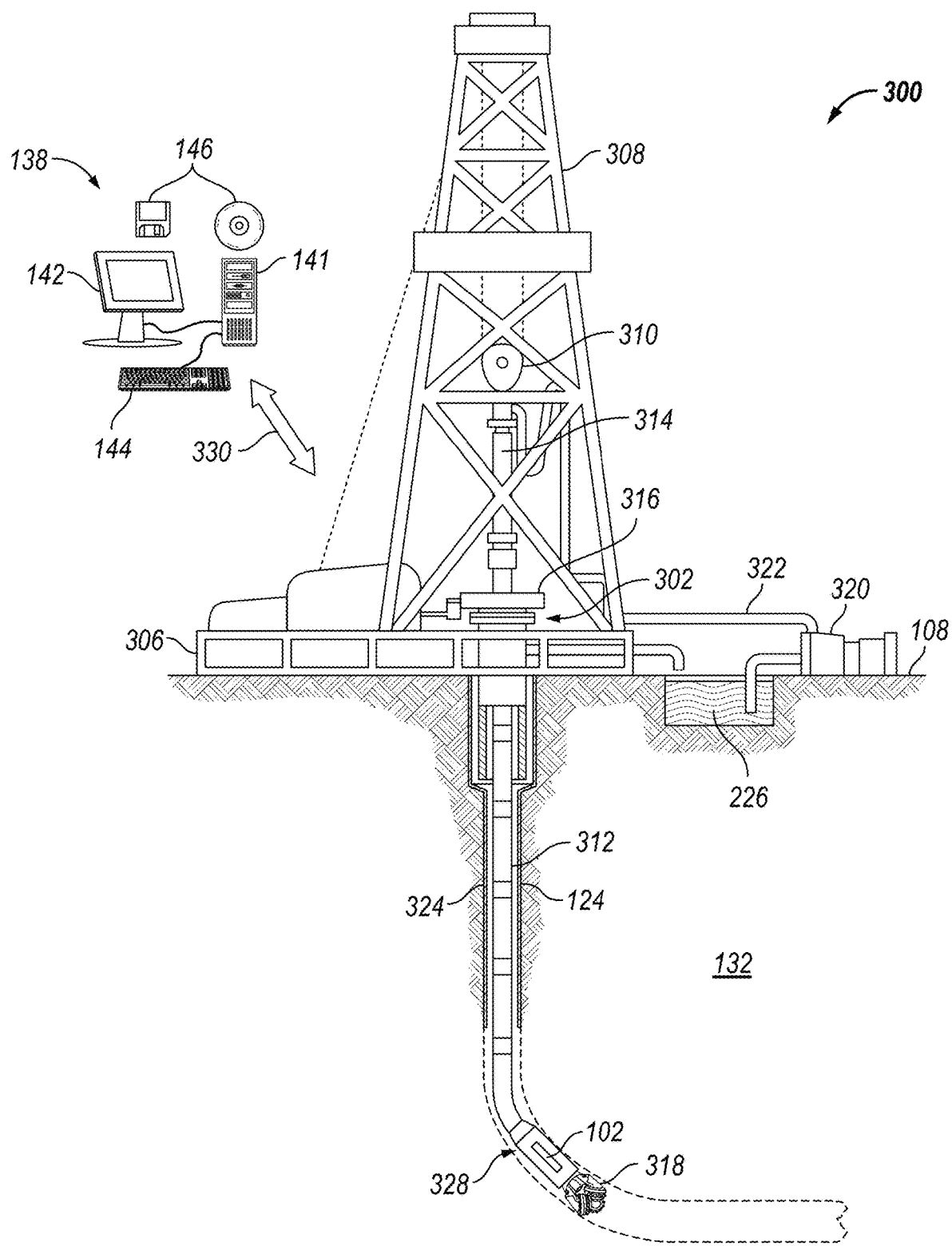
FIG. 3 illustrates another example of a well measurement system.

FIG. 3 illustrates an example in which downhole tool 102 may be disposed in a drilling system 300. As illustrated, borehole 124 may extend from a wellhead 302 into formation 132 from surface 108. As illustrated, a drilling platform 306 may support a derrick 308 having a traveling block 310 for raising and lowering drill string 312. Drill string 312 may include, but is not limited to, drill pipe and coiled tubing, as generally known to those skilled in the art. A kelly 314 may support drill string 312 as it may be lowered through a rotary table 316. A drill bit 318 may be attached to the distal end of drill string 312 and may be driven either by a downhole motor and/or via rotation of drill string 312 from surface 108. Without limitation, drill bit 318 may include, roller cone bits, PDC bits, natural diamond bits, any hole openers, reamers, coring bits, and the like. As drill bit 318 rotates, it may create and extend borehole 124 that penetrates various formations 132. A pump 320 may circulate drilling fluid through a feed pipe 322 to kelly 314, downhole through interior of drill string 312, through orifices in drill bit 318, back to surface 108 via annulus 324 surrounding drill string 312, and into a retention pit 326.

With continued reference to FIG. 3, drill string 312 may begin at wellhead 302 and may traverse borehole 124. Drill bit 318 may be attached to a distal end of drill string 312 and may be driven, for example, either by a downhole motor and/or via rotation of drill string 312 from surface 108. Drill bit 318 may be a part of bottom hole assembly 328 at distal end of drill string 312. Bottom hole assembly 328 may further include downhole tool 102. Downhole tool 102 may be disposed on the outside and/or within bottom hole assembly 328. Downhole tool 102 may include test cell 334. As will be appreciated by those of ordinary skill in the art, bottom hole assembly 328 may be a measurement-while drilling (MWD) or logging-while-drilling (LWD) system.

Without limitation, bottom hole assembly 328 may be connected to and/or controlled by information handling system 114, which may be disposed on surface 108. Without limitation, information handling system 114 may be disposed down hole in bottom hole assembly 328. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 328 may be brought to surface 108. In examples, information handling system 114 may communicate with bottom hole assembly 328 through a fiber optic cable (not illustrated) disposed in (or on) drill string 312. In examples, wireless communication may be used to transmit information back and forth between information handling system 114 and bottom hole assembly 328. Information handling system 114 may transmit information to bottom hole assembly 328 and may receive as well as process information recorded by bottom hole assembly 328. In examples, a downhole information handling system (not illustrated) may include, without limitation, a microprocessor or other suitable circuitry, for estimating, receiving and processing signals from bottom hole assembly 328. Downhole information handling system (not illustrated) may further include additional components, such as memory, input/output devices, interfaces, and the like. In examples, while not illustrated, bottom hole assembly 328 may include one or more additional components, such as analog-to-digital converter, filter and amplifier, among others, which may be used to process the measurements of bottom hole assembly 328 before they may be transmitted to surface 108. Alternatively, raw measurements from bottom hole assembly 328 may be transmitted to surface 108.

Any suitable technique may be used for transmitting signals from bottom hole assembly 328 to surface 108, including, but not limited to, wired pipe telemetry, mud-pulse telemetry, acoustic telemetry, and electromagnetic telemetry. While not illustrated, bottom hole assembly 328 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 330, which may be a wired or wireless link. The telemetry data may be analyzed and processed by information handling system 114.

As illustrated, communication link 330 (which may be wired or wireless, for example) may be provided that may transmit data from bottom hole assembly 328 to an information handling system 114 at surface 108. Information handling system 114 may include a processing unit 116

(Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Figure 4A:
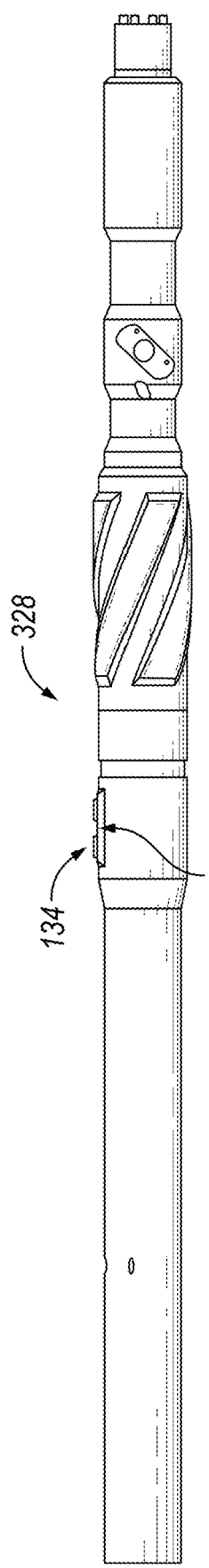
FIGS. 4A-4C illustrate an example of a pad.
Figure 4B:
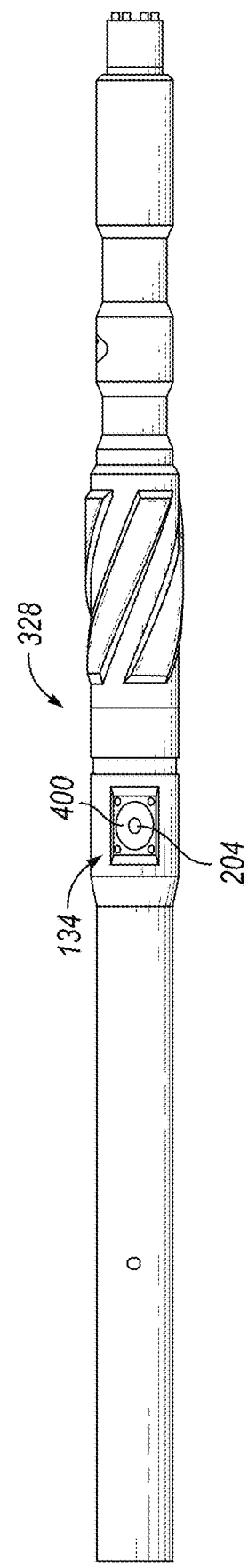
Figure 4C:
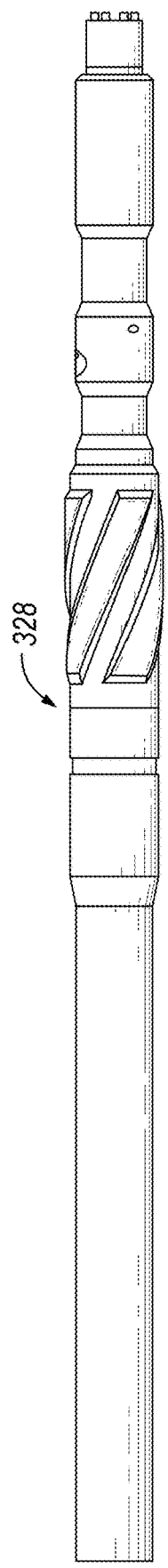

FIGS. 4A-4C illustrate an example of bottom hole assembly 328 that includes an example of a logging-while-drilling (LWD) and/or measuring-while-drilling (MWD) imaging oil based mud imager tool. Water based mud imagers may have similar designs, and may generally provide less design and interpretation complications than oil based mud imagers due to the conductive nature of the water based mud. As described below, bottom hole assembly 328 may provide a high resolution image of borehole 124 (e.g., referring to FIG. 3) and may be used to identify damaged sections of borehole 124. This may provide knowledge on thin beds in formation 132 and also provide images that may be used to determine a dip angle of formation beds.

In this example, oil based mud imager tool may include an injector electrode 204 and a guard electrode 400. Guard electrode 400 may surround the injector electrode 204 and may be in electrical contact with it. In examples, injector electrode 204 and guard electrode 400 may be excited by an alternating current, sine-wave generator, and it may be coupled to formation 132 (e.g., referring to FIG. 3) through the oil based mud. The mud is non-conductive for oil based muds, consequently, the coupling to formation 132 is by displacement currents in the mud. This may allow injector electrode 204 and guard electrode 400 to sense impedance of formation 132 (e.g., referring to FIG. 3). This arrangement provides a low sensitivity to standoff changes in the microresistivity image.

In an LWD environment, the sensor topology can have minimum complexity, and more importantly, may not rely on contact with borehole 124 (e.g., referring to FIG. 3). During measurement operations, a current enters formation 132 from injector electrode 204, which may have a much lower resistivity than the mud. The current penetrates formation 132 and then returns back toward borehole 124 where it returns to bottom hole assembly 328. The body of bottom hole assembly 328 may remain at ground potential because of its large surface area.

Imaging is accomplished by dividing data into azimuthal bins as bottom hole assembly 328 (e.g., referring to FIG. 3) rotates in borehole 124 (e.g., referring to FIG. 3) during drilling operations. Thus, azimuthal coverage provided by individual injector electrodes 204 in a wireline oil based mud imager tool is obtained by the rotation of a single injector electrode 204 instead in the LWD/MWD case. In examples, LWD/MWD imager tool may also include multiple injector electrodes 204 separated axially or radially. Nonetheless, total number of injector electrodes 204 may be less than a wireline imager tool (e.g., referring to FIG. 1). Although mechanisms of how impedance images are obtained is different between LWD/MWD and wireline imager tools, the format of the resulting data may be the same. Therefore, processing methods disclosed below are equally applicable to both wireline tools and LWD/MWD tools.

Figure 5:
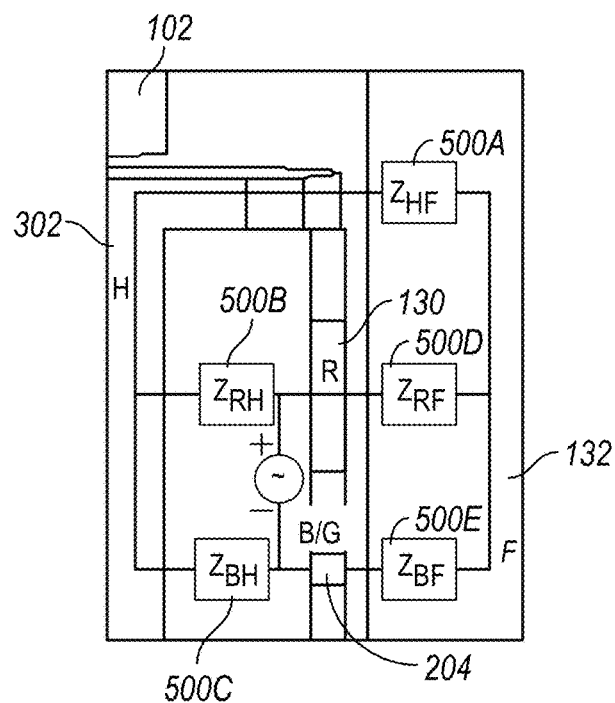
FIG. 5 is a circuit model that may approximate an isolated pad from FIG. 2.

FIG. 5 illustrates an example of a circuit model that may approximate the pad 134 illustrated in FIG. 2. Effects of the transmitted current may be approximately characterized by a housing-to-formation impedance value 500A, a return electrode-to-housing impedance value 500B, a return electrode-to-formation impedance value 500C, a button-to-housing impedance value 500D, and a button-to-formation impedance value 500E. Impedance may be calculated below, wherein Z is the impedance, $V_{BR}$ is the button-to-return electrode voltage and $I_B$ is the button current:

$$Z = V_{BR}/I_B \quad (1)$$

The value calculated in Equation (1) may be equal to $Z_{BF} + Z_{RF}$, as shown in FIG. 5, wherein $Z_{BF}$ is the impedance from injector electrode 204 to formation 132 and $Z_{RF}$ is the impedance of return electrode 130 to formation 132. Note that for different injector electrodes 204 of the button array 128, these impedances may differ based on the variations in borehole 124 (e.g., referring to FIGS. 1 and 2) and the environment. These variations in measured impedances in an impedance image may be used to determine geophysical features. Also note that both $Z_{BF}$ and $Z_{RF}$ have contributions from both the surrounding mud and formation 132 (e.g., referring to FIG. 1). As the surface area of return electrodes 130 are much larger than those of injector electrodes 204, $Z_{RF}$ may be very small compared to $Z_{BF}$ and thus may be ignored. Thus, equivalently it may be written in Equation (2) as:

$$Z \approx Z_{BF} = Z_{mud} + Z_F \quad (2)$$

As a result, measured impedance may have contributions from both the mud and formation 132, wherein $Z_{mud}$ is the impedance of the mud and $Z_F$ is the impedance of formation 132. Measured impedance may comprise one or more measurements. The one or more measurements may be one or more complex-numbers, of both real and imaginary parts. Imaginary parts of $Z_F$ and $Z_{mud}$ may be assumed to be mainly capacitive. Assuming this capacitance may be in parallel with the resistive portion, then $Z_{BF}$ may also be written as:

$$Z_{BF} = \frac{1}{\left(\frac{1}{R_M} + j\omega C_M\right)} + \frac{1}{\left(\frac{1}{R_F} + j\omega C_F\right)} \quad (3)$$

wherein $R_M$ is the mud resistance, $R_F$ is the resistance of formation 132, $C_M$ is the mud capacitance, $C_F$ is the capacitance of formation 132, j is the unit imaginary number, and $\omega$ is the angular frequency. Both the mud resistance and mud capacitance may increase as standoff increases and may decrease with the increase in effective area of injector electrode 204. "Standoff" may be used to denote the distance of the pad 134 (e.g., Referring to FIG. 3) from a wall of borehole 124 (e.g., referring to FIG. 1). Standoff of each injector electrode 204 in button array 128 may vary. In examples, standoffs of return electrode 130 may differ from those of injector electrodes 204 as well. Standoff variations may significantly affect button-to-formation impedance value 500E. In the simplified circuit model, it may be assumed that the standoff of each component of pad 134 may be constant. Standoff may assume that pad 134 is movable while downhole tool 102 remains immobile. In examples, to achieve large distances from the wall of borehole 124, downhole tool 102 may be moved along with pad 134. In examples, the term "eccentricity" may be used instead of "standoff". The proposed methods (discussed further below) may be equally valid whether pad 134 moves or both pad 134 and downhole tool 102 move.

Figure 6:
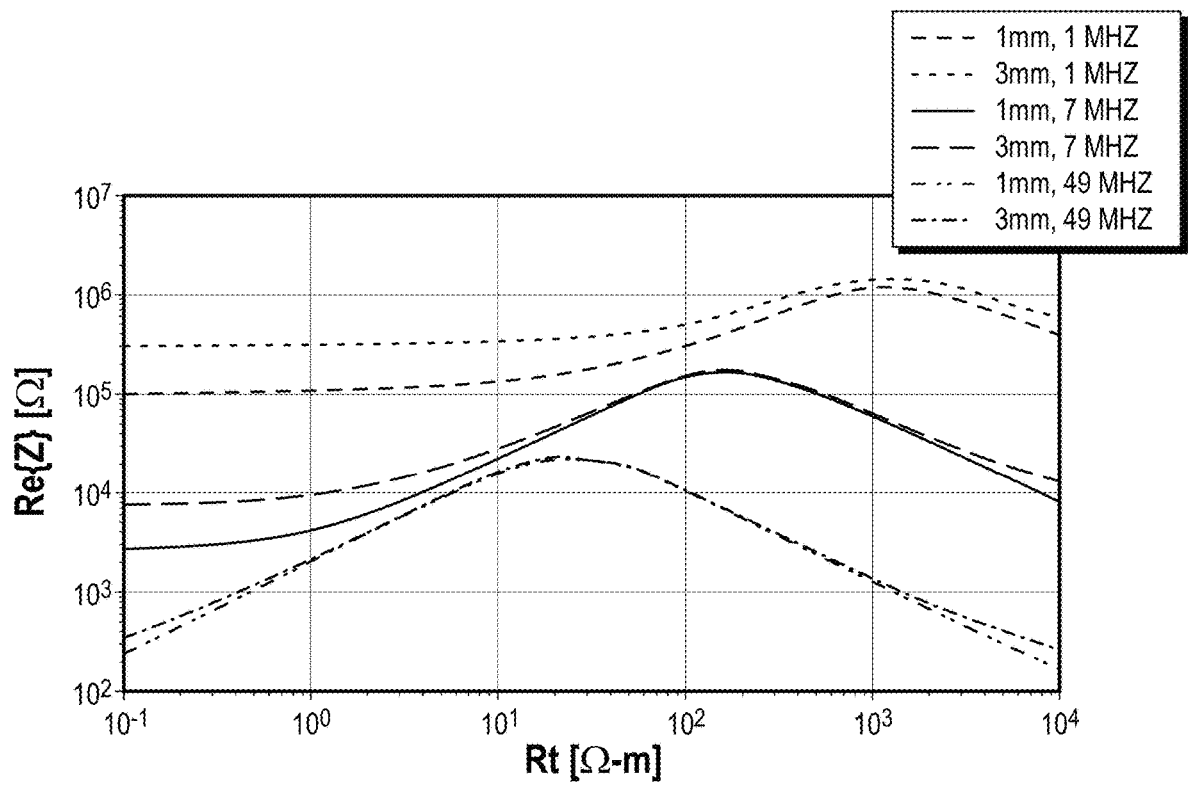
FIG. 6 is a graph illustrating a real part of measured impedance versus formation resistivity.

Equation (3) may be used to obtain basic performance curves for downhole tool 102. These basic performance curves may be fairly accurate in homogeneous formations 132 (e.g., referring to FIG. 1) in determining the variation of the response of an exemplary injector electrode 204 in button array 128 with changing environmental parameters. In FIG. 6, the real part of the measured impedance versus the formation resistivity may be determined using Equation (3), which is illustrated on graph in FIG. 6. The imaginary part of the impedance may be determined by the mud capacitance, therefore it may not be necessary to plot it. In an example, illustrated in FIG. 6, it may be assumed that formation permittivity (εF) is 15, mud permittivity (εM) is 6, and mud resistivity (ρM) is 8000 Ω-m. Results for three different frequencies (1 MHz, 7 MHz and 49 MHz) at two different standoffs (so=1 mm and so=3 mm), where (so) stands for standoff of the tool, may be displayed in FIG. 6.

As illustrated in FIG. 6, a separation between different standoffs at lower formation resistivities may be viewed. This effect may be more pronounced if the frequency is lower. At higher formation resistivities, the dielectric effect in formation 132 (e.g., referring to FIG. 1) may cause a roll-off in measured impedance, as illustrated in FIG. 6. Operating in a linear region of the curve, displayed in FIG. 6, may produce a more accurate correspondence between the impedance image and that of the true formation resistivity. The standoff effect at low formation resistivities may cause an ambiguity in the interpretation of the impedance images. These raw measurements may be used, but the contrast of the resistivity image may be reduced. Furthermore, small errors in standoff measurements may cause a large difference in the impedance reading. It may be observed from FIG. 4 that measured impedance may begin to decrease as the formation resistivity increases. This "rolloff" may be caused by the dielectric effects in the formation 132 (e.g., referring to FIG. 1) and may become more pronounced at higher frequencies.

The graph in FIG. 6 illustrates that lower frequencies may be more suitable for measuring high formation resistivities while higher frequencies are more suitable to measure lower formation resistivities. For this reason, downhole tool 102, which may be a downhole imaging tool, such as an oil based mud imager or water based mud imager, may generally be implemented as multi-frequency tools. Multi-frequency measurements may also reduce uncertainty in resolving different mud and formation properties through an inversion or machine learning process. Operational frequencies of downhole tool 102 (e.g., referring to FIGS. 1 and 3) may be adjustable through a central control unit and may be changed based on the specifications of the job.

Figure 7:
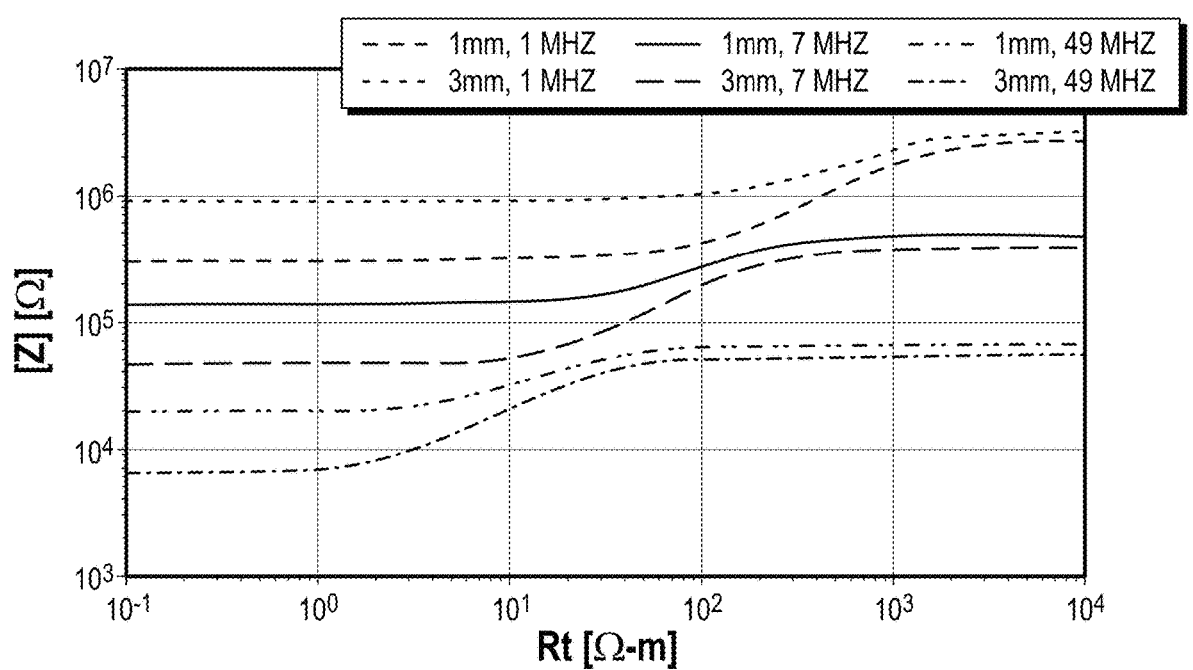
FIG. 7 is a graph illustrating an absolute value of the impedance versus the formation resistivity.

The graph in FIG. 7 illustrates an absolute value of the impedance versus the formation resistivity for the same case in FIG. 6. As illustrates, the absolute value of the impedance does not suffer a "roll-off" due to the dielectric effect at high formation resistivities although the sensitivity of downhole tool 102 (e.g., referring to FIG. 1) to the resistivity is reduced. For example, the absolute value is almost flat with changing formation resistivity.

As discussed above, FIG. 5 illustrates a basic circuit model to demonstrate the operating principles of downhole tool 102. Although there exist higher order effects that may not be captured in the basic circuit model, in most practical cases the basic circuit model may be used successfully to gain valuable insight into measurement operations performed by downhole tool 102.

Using the basic circuit model in FIG. 5, in cases where there is no mud (i.e., no standoff), Equation (3) may be modified as follows:

$$Z_{BF} = \frac{R_F}{(1 + j\omega C_F R_F)} = \frac{R_F - j\omega C_F (R_F)^2}{\left(1 + (\omega C_F R_F)^2\right)} \quad (4)$$

As a result, when formation resistivity is low, a real part of the measured impedance may be approximately equal to $R_F$. This resistance is in turn a function of resistivity. In examples, this function may be approximated as a simple constant multiplying the formation resistivity, which may be denoted as the tool constant k, as seen below:

$$R_F \approx k\rho_F \quad (5)$$

A tool constant is a function of the tool geometry. For example, FIG. 2 illustrates a pad 134 with one or more injector electrodes 204. However, replacing the one or more injector electrodes 204 with other types of injector electrodes may produce a different tool constant. For example, the currents of injector electrodes 204 in the middle of button array 128 may be better focused due to currents emanating from injector electrodes 204 on the sides of button array 128, forcing them to flow laterally. As a result, these altered injector electrodes 204 may be less affected by mud and penetrate more into formation 132 (e.g., referring to FIG. 1). On the other hand, injector electrodes 204 on the side would be less focused and currents emanating from injector electrodes on the side may spread more. Thus, they would also be more affected by the rugosity of borehole 124. This may result in a "cupping" (also known as the "geometric factor") effect on the images obtained by downhole tool 102 (i.e., an oil-based mud resistivity imager).

Figure 8:
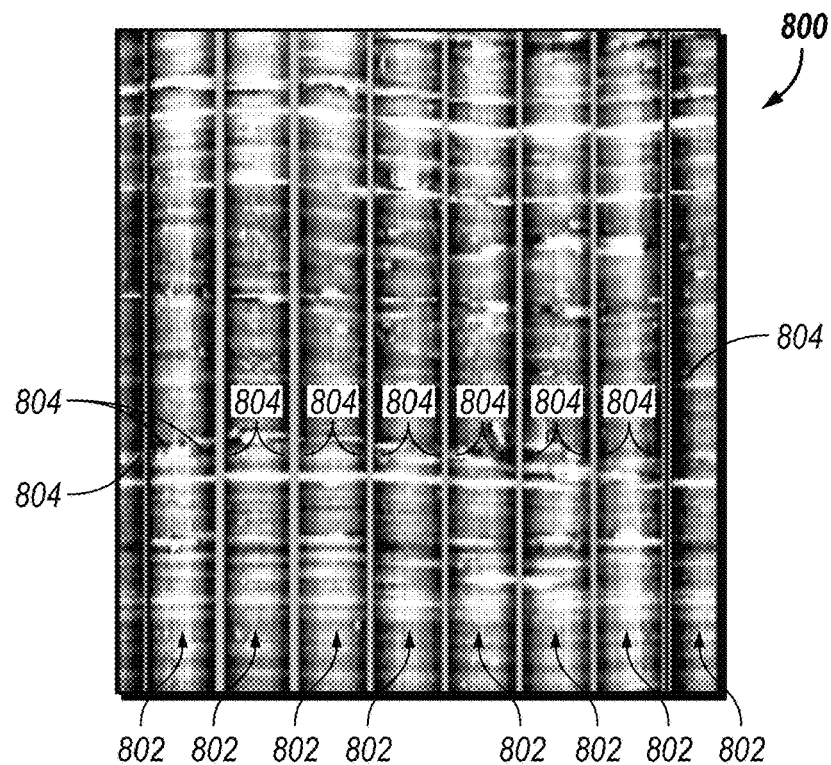
FIG. 8 is an image that includes a cupping effect.

FIG. 8 illustrates an image 800 (i.e., a raw image) produced by one or more measurements taken from downhole tool 102 (e.g., referring to FIG. 1), in which a cupping effect is seen. All measurements discussed above and below may represent a real and an imaginary component of the one or more measurements. As illustrated, there are eight images, taken by eight different pads 134 (e.g., referring to FIG. 1) to form image 800. As illustrates, the measured impedance is higher (i.e., lighter colors) identified as 802 at the center of pad 134 and lower (i.e., darker colors) identified as 804 at the edges, which may result in a cup-like pattern. Furthermore, different injector electrodes 204 (e.g., referring to FIG. 2) may be connected to different electronic components. In the most basic sense, each injector electrode 204 may have different trace lengths. They may also be connected to different circuit components such as power amplifiers and multiplexers. If not properly calibrated, this may result in a "striping" effect due to the variations between the individual injector electrodes 204.

Figure 9:
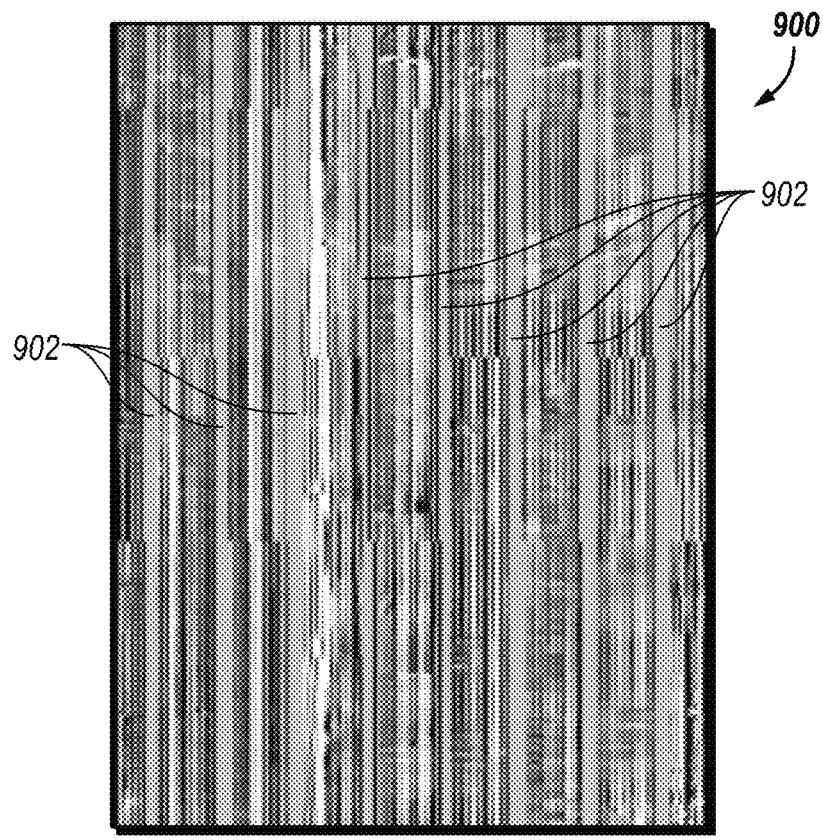
FIG. 9 is another image that includes a striping pattern.
Figure 10:
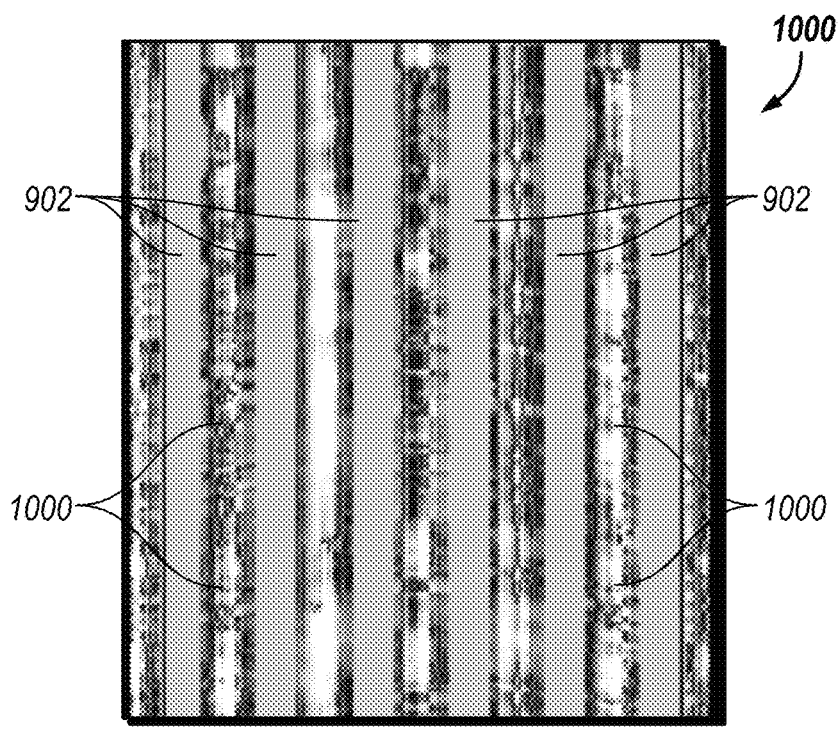
FIG. 10 is another image with one or more speckles.
Figure 11:
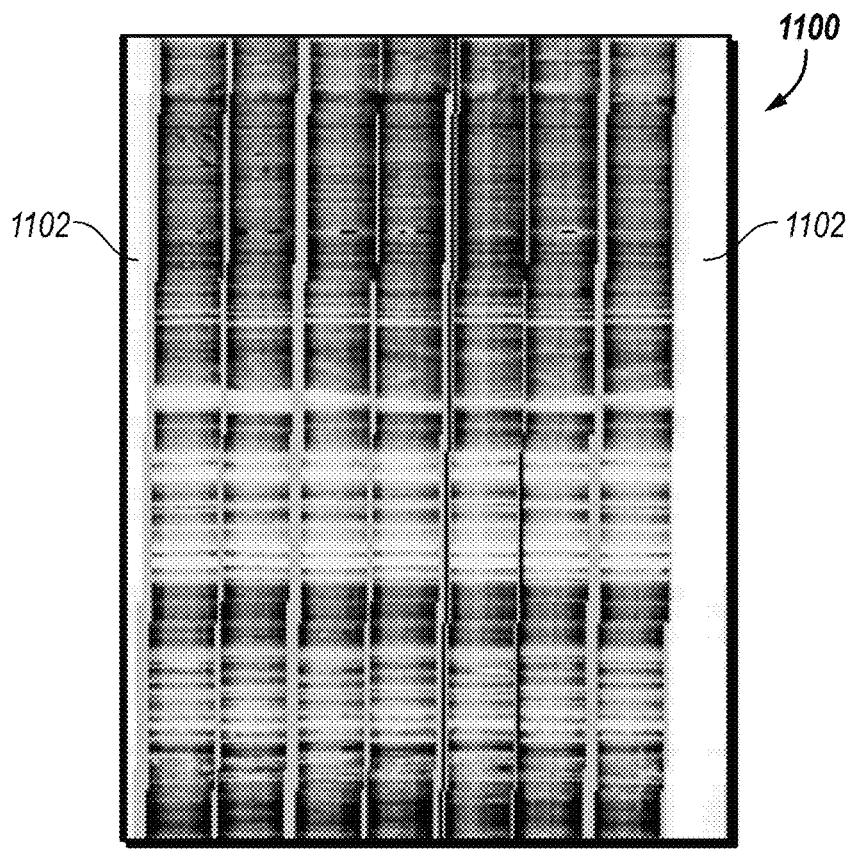
FIG. 11 is another image with a different gain reading for one of the pads.

FIG. 9 illustrates an image 900 (i.e., a raw image) produced by one or more measurements taken from downhole tool 102 (e.g., referring to FIG. 1), in which a striping effect is seen. As illustrated, the striping effect 902 may dominate the underlying variations due to the changes in formation properties. This may make a proper interpretation of image 900 difficult. Other artifacts 1000 may include speckles and spikes (little dots in the image) as shown in FIG. 10 and uneven pad gain as shown in FIG. 11 where an image 1100 from one of the pads 134 (e.g., referring to FIG. 2) is seen as a yellow vertical stripe 1102 with little contrast and details due to reduced dynamic range compared to other pads. Speckles and spikes in the image may be caused by downhole tool 102 (e.g., referring to FIG. 1) and environmental noises or intermittent electronic problems during the acquisition of the data while uneven pad gain may be due to a problem with the tool electronics or the actuation of pad 134 that may reduce the contact pressure for that specific pad 134 relative to the others.

Figure 12A:
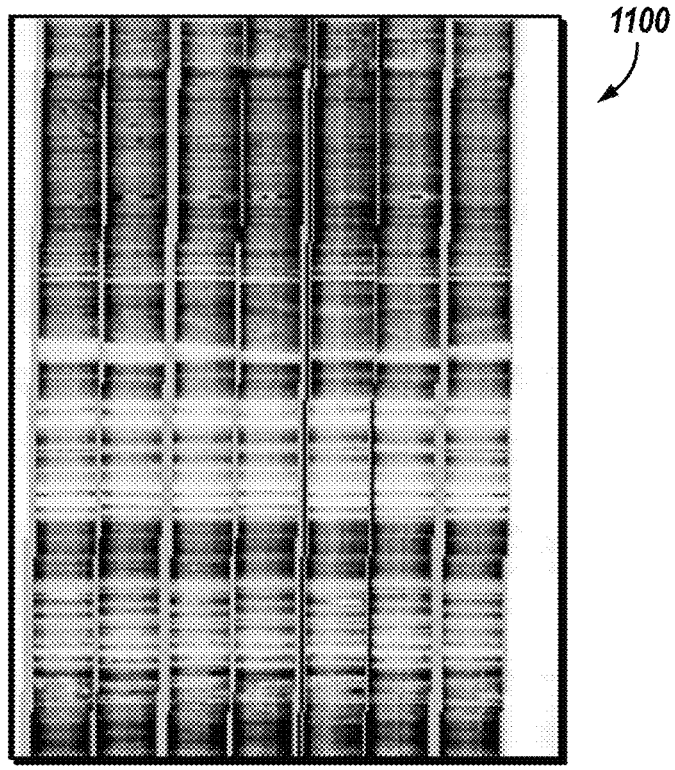
FIGS. 12A and 12B illustrate traditional processing techniques on an image.
Figure 12B:
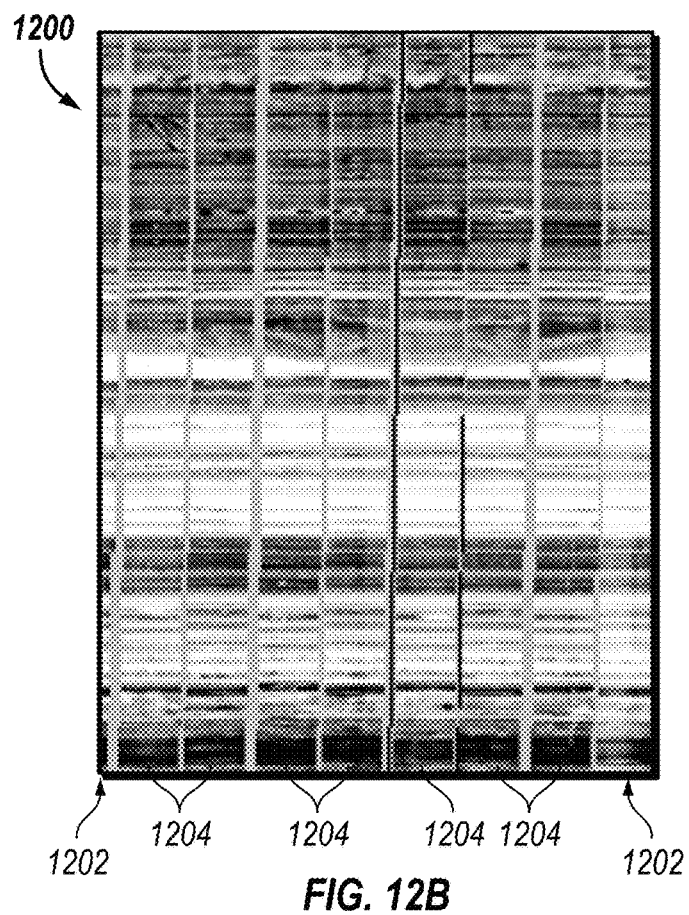

Currently, there are processing techniques that may be utilized to improve images taken by downhole tool 102 (e.g., referring to FIG. 1). For example, FIG. 12 A illustrates image 1100 from FIG. 11 along with image 1200 that is a result from applying traditional processing techniques to image 1100. As illustrated in FIG. 12B, the yellow vertical stripe 1102 has been removed from image 11000 in FIG. 12A. In FIG. 12B, pad image 1202 with the reduced dynamic range shows similar levels of detail to other pads images 1204 after processing. The geometric factor effect in all pad images (i.e., 1202 and 1204) has been resolved as well. As a result, the processed image 1200 has greatly enhanced contrast and details. This processing was based on calculating a histogram of the tool over a sliding window of 30 ft (10 meters) length (along depth dimension.) It should be noted that the sliding window may have a preset size. Then, the variations of each of injector electrode 204 (e.g., referring to FIG. 2) were equalized to have same mean and standard deviation over this window. Although current processing techniques may work in some examples, drawbacks of using current processing techniques are that current processing techniques may only mask and add error into measurements taken by downhole tool 102 (e.g., referring to FIG. 1).

For example, current processing techniques may rely on statistical averaging over a sliding window. Thus, they are prone to errors if there are sharp variations within a sliding window, such as pads 134 losing contact with the wall of borehole 124. Additionally, a formation bed with significantly different properties may throw off the statistical calculations. During measurement operations using a sliding window is generally not utilized as it is not suitable for real-time applications. In some examples, the entirety of borehole 124 (e.g., referring to FIG. 1) may need to be logged for statistical calculations which prevent a real time application. Even if a smaller window of 30 ft is used, if the logging speed is 10 ft per minute, a delay of 1.5 minutes between the actual logging and a processing of a response may occur. Furthermore, there is a limit to how small the window size may be, otherwise, statistical calculations would be biased, and real features within formation 132 (e.g., referring to FIG. 1) may be smoothed out and removed from the final image.

Other issues with current processing techniques are the requirement for constant human interaction, which is time consuming and labor intensive. There may be parameters such as the window length that may need to be tuned by an operator in traditional processing techniques. This may lead to subpar results if non-optimal parameters are used as well as inconsistencies obtained by different operators.

For this reason, an alternative, supervised machine learning based approach is proposed for denoising images and removing artifacts. As discussed above and below, artifacts that may be found in raw data images may be, but are not limited to, systematic button-to-button variations, spikes, pad-to-pad offsets, dielectric effects, standoff effects, speckles, spikes, striping, and/or the like. In this approach, the regression function may be determined using a training dataset and whenever a new well is being imaged, measured data may be plugged in to the already determined regression function to produce the processed image log. In examples, a supervised machine learning based approach may be utilized in post-processing as well if the real-time results are not needed.

In a supervised machine learning algorithm, an optimal function that relates a given set of inputs and outputs is found where the outputs corresponding to given inputs are already known. That is, a regression function is found from a dataset with known inputs and outputs. This dataset is denoted as the training, validation and testing dataset in this disclosure.

The inputs to such a supervised machine learning algorithm in this application may be images obtained from the (modeled or experimental) measurements of downhole tool 102 (e.g., referring to FIG. 1). These images may represent the apparent resistivity for one or more pads 134 (i.e., real part of impedivity for each of the one or more pads 134) They may also represent the imaginary part of the apparent impedivity, absolute value of the apparent impedivity or phase of the apparent impedivity for an impedance imager. These images are denoted as raw images. During measurements operations, basic processing may have been applied to the raw images such as the application of a calibration, scaling with a tool constant etc. and raw refers to its status with respect to the processing techniques disclosed in this disclosure. Images may contain the measurements from a certain number of injector electrodes 204 (e.g., referring to FIG. 2) over a certain logging interval. For example, if there are twenty-four injector electrodes 204 disposed in pad 134 of downhole tool 102, the image size may be made equal to 24×24 (i.e., measurements from all injector electrodes 204 from a pad 134 over a depth interval of 24 samples.) In measurement operations, with a 10 ft per minute logging rate, and a tool resolution of 0.1 inches, this choice leads to a delay of just 1.2 seconds (ignoring the processing time) between the measurements and displaying the processed results. Thus, such an approach is much more suited to a near real-time implementation than the traditional processing techniques. It should be noted that the above image size is given as an example, other image sizes may be utilized in measurement operations by downhole tool 102. For example, measurements from all injector electrodes 204 may be included in the image. For a downhole tool 102 with eight pads 134, and twenty-four injector electrodes 205 disposed on each pad 134, such an image corresponds to 192 pixels in the azimuthal direction. Additionally, the number of pixels in the depth direction may again be twenty-four or any other suitable number.

The supervised machine learning algorithm disclosed below may be implemented in real time if the depth dimension of the images is selected to be 1 (i.e., processing depth-by-depth). However, such an implementation may reduce the accuracy of the resulting corrections. In examples, downhole tool 102 (e.g., referring to FIG. 1) may be a multi-frequency tool. Thus, images from measurements operation may utilize all of the individual frequencies, which may be processed concurrently in a parallel manner. The supervised machine learning algorithm may be used for all the frequencies or, if it is expected that the corrections should differ between different frequencies, a separate model may be created for each individual frequency. Similarly, if downhole tool 102 is an impedance imager, if both the real and imaginary parts of the apparent impedivity (or phase and amplitude of the apparent impedivity) needs to be processed, separate supervised machine learning algorithm may be created for both components.

Figure 13:
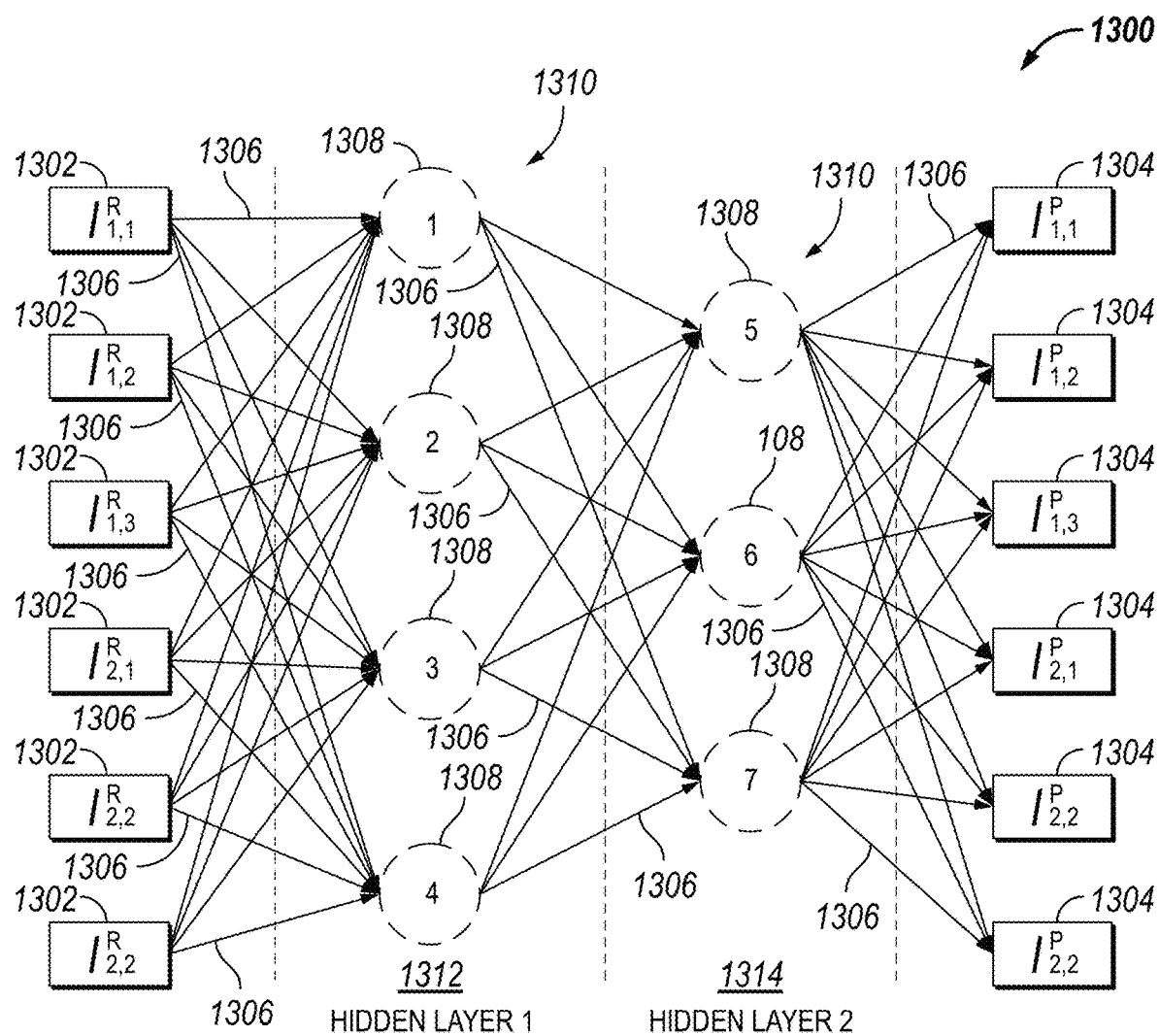
FIG. 13 is a schematic of an artificial neural network.

A supervised machine learning algorithm may utilize an artificial neural network to process measurements from measurement operations to form an image during processing operations. FIG. 13 illustrates an artificial neural network 1300 with one or more inputs 1302 and one or more outputs

1304. For a given set of inputs 1302 and outputs 1304, artificial neural networks may determine a regression function that provides an optimal relationship between input 1302 and output 1304. Optimization may be based on minimizing a cost function. Similar to how biological neurons operate, it is assumed that information between inputs 1302 to outputs 1304 may be passed through connections 1306 (edges) in an artificial neural network. In most neural network solutions, additional internal (hidden) nodes 1308 may be introduced to increase the number of connections and improve the accuracy of the solution. These nodes 1308 may be interconnected to inputs 1302 and outputs 1304 as well as each other. In some systems, there may be multiple layers of hidden nodes 1308. In examples, if there are two hidden layers 1310, there may be connections between inputs 1302 and nodes 1308 of a $1^{st}$ hidden layer 1312. Nodes 1308 in $1^{st}$ hidden layer 1312 may be furthermore connected to nodes 1308 in a $2^{nd}$ hidden layer 1314. Number of nodes 1308 and hidden layers (i.e., 1312, 1314) are called "hyperparameters" of artificial neural network 1300. Finally, nodes 1308 in $2^{nd}$ hidden layer 1314 may be connected to outputs 1304. In other words, input 1302 and outputs 1304 may not be connected directly but through nodes 1308 of one or more hidden layers 1310.

As illustrated in FIG. 13, artificial neural network 1300 may comprise inputs 1302 that may be assumed to be resistivity values from a, for simplicity, 2×3 image (i.e., 2 depth points and 3 azimuthal points.) As illustrated, inputs 1302 may be measurements derived as $I_{i,j}^{R}$, which denotes the pixel of the raw image for the $i^{th}$ depth point in a depth interval at the $j^{th}$ azimuthal point of an injector electrode 204 (e.g., referring to FIG. 2). These resistivity values may be from measurement operations discussed above. This example may easily be extended to a higher number of pixels. For example, for a 24×24 image, input 1302 and output 1304 may have 24 times 24=576 nodes. In this example, there are two hidden layers 1310. $1^{st}$ hidden layer 1312 comprises four nodes 1308 while $2^{nd}$ hidden layer 1314 has three nodes 1308. Processing from nodes 1308 in $1^{st}$ hidden layer 1312 and $2^{nd}$ hidden layer 1314 gives output 1304. Output 1304 is a processed answer where $I_{i,j}^{P}$ is the corresponding processed pixel, where for the $i^{th}$ depth point in a depth interval at the $j^{th}$ azimuthal point of an injector electrode 204. In examples, depth intervals of one or more images may overlap. This may be done intentionally, or it may be required in a case where the number of depth points in an image is not an integer factor of the number of pixels of the image in depth dimension in a log. In those cases, the images may be averaged where they overlap or a transitional function between the overlapping pixels in the images may be used where the transitional function puts higher weight to a first image on one side and a higher weight to the second image on the other side.

For artificial neural network 1300 there are no set rules for the number of nodes 1308 that may be utilized. However, in artificial neural network 1300 the number of nodes 1308 may generally be chosen based at least in part on the order of the number of inputs 1302 multiplied by the number of outputs 1304. Similarly, there are no rules for the number of hidden layers (i.e., 1312, 1314), however, at least one hidden layer may be suitable. It should be noted that the larger an artificial neural network 1300 is, the larger computational load and computing time for processing may be. The computational load and computing time may be spread over a network that comprises a plurality of information handling systems 114.

Figure 14:
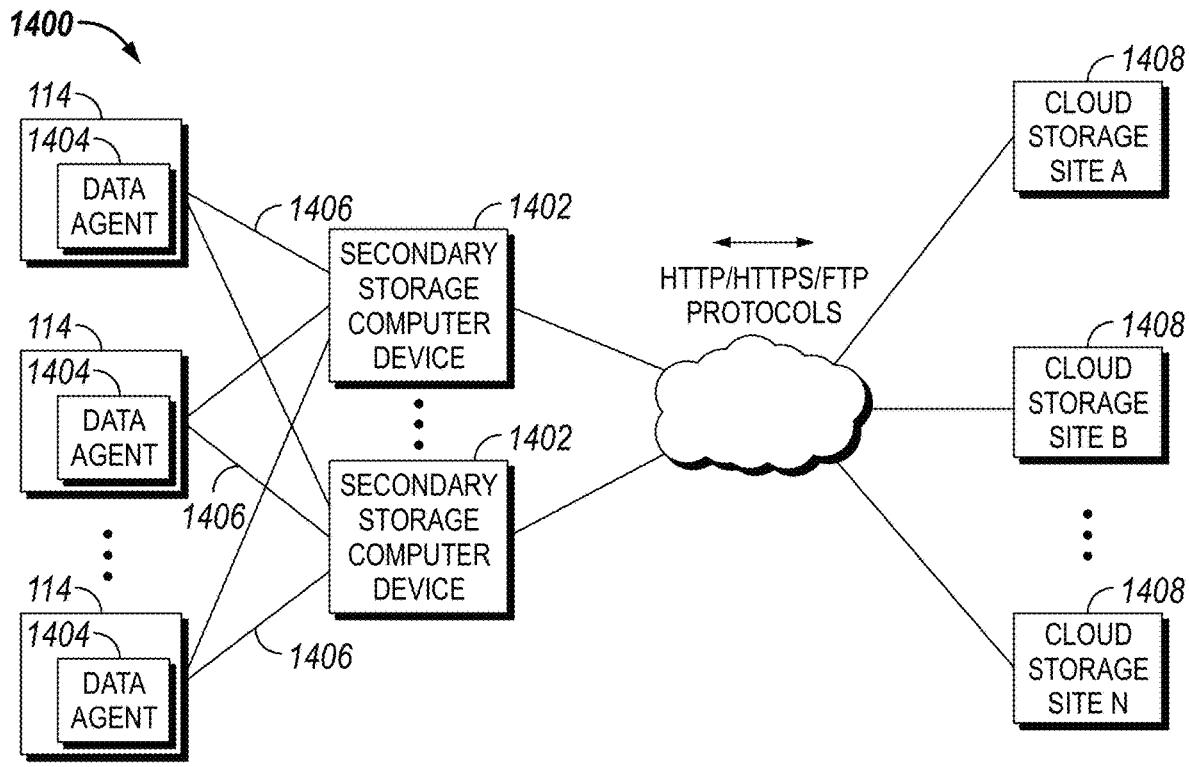
FIG. 14 is a schematic of a computer network.

FIG. 14 illustrates an example of one arrangement of resources in a computing network 1400 that may employ the processes and techniques described herein, although many others are of course possible. As noted above, an information handling system 114, as part of their function, may utilize data, which comprises files, directories, metadata (e.g., access control list (ACLS) creation/edit dates associated with the data, etc.), and other data objects. The data on the information handling system 114 is typically a primary copy (e.g., a production copy). During a copy, backup, archive or other storage operation, information handling system 114 may send a copy of some data objects (or some components thereof) to a secondary storage computing device 1402 by utilizing one or more data agents 1404.

A data agent 1404 may be a desktop application, website application, or any software-based application that is run on information handling system 114. As illustrated, information handling system 114 may be disposed at any well site (e.g., referring to FIG. 1) or at an offsite location. The data agent may communicate with a secondary storage computing device 1402 using communication protocol 1406 in a wired or wireless system. Communication protocol 1406 may function and operate as an input to a website application. In the website application, field data related to pre- and post-operations, notes, and the like may be uploaded. Additionally, information handling system 114 may utilize communication protocol 1406 to access processed measurements, troubleshooting findings, historical run data, and/or the like. This information is accessed from secondary storage computing device 1402 by data agent 1404, which is loaded on information handling system 114.

Secondary storage computing device 1402 may operate and function to create secondary copies of primary data objects (or some components thereof) in various cloud storage sites 1408A-N. Additionally, secondary storage computing device 1402 may run determinative algorithms on data uploaded from one or more information handling systems 114, discussed further below. Communications between the secondary storage computing devices 1402 and cloud storage sites 1408 A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 1408 A-N, the secondary storage computing device 1402 may also perform local content indexing and/or local object-level, sub-object-level or block-level deduplication when performing storage operations involving various cloud storage sites 1408 A-N. Cloud storage sites 1408 A-N may further record and maintain logs for each downhole operation or run, store repair and maintenance data, store operational data, and/or provide outputs from determinative algorithms that are located in cloud storage sites 1408 A-N. In a non-limiting example, this type of network may be utilized as a platform to store, backup, analyze, import, preform extract, transform and load ("ETL") processes, mathematically process, apply machine learning algorithms, and interpret the data acquired by one or more downhole tools 102 (e.g., referring to FIG. 1).

During processing operations with artificial neural network 1300, processing performed by each node 1308 involves a certain weight. For each connection 1316, a certain weight may be calculated during training. These weights define the value of each node 1308 in terms of the values of other nodes 1308 with outgoing connections 1316 to that node 1308. For example, a node 1308 identified with label 1 in FIG. 13 has incoming connections 1316 from all inputs 1302. Thus, value of node 1 (N1) becomes:

$$N1 = f(w_1 \times I_{1,1}{}^R + w_2 \times I_{1,2}{}^R + w_3 \times I_{1,3}{}^R + w_4 \times I_{2,1}{}^R + w_5 \times I_{2,2}{}^R + w_6 \times I_{2,3}{}^R) \quad (6)$$

In Equation (6), $w_1$ is the weight between connection 1316 of node 1 and an input 1302 that is specific to $I_{1,1}{}^R$, and so on. Additionally, $f$ denotes a specified function. As an example, $f$ may be the sigmoid function with the definition given by Equation 7, seen below:

$$\sigma(x) = 1/1 + e^{-x} \quad (7)$$

Although not depicted in the above example, an additional bias node may be added to each layer (e.g., 1312, 1314), except output 1304, to provide a DC offset to the values. Bias nodes do not have incoming connections 1316 and they only provide outgoing connections 1316 to the subsequent layer. By convention, bias nodes have a value of 1. By optimizing the weights of connections 1316, a regression function may be found for artificial neural network 1300.

To find the regression function, a training dataset may be used to "train" artificial neural network 1300. A training dataset has known inputs 1302 and outputs 1304 (e.g., referring to FIG. 13). A training dataset may be formed through any number of simulations. Commercial electromagnetic simulation software based on algorithms such as Finite Difference Time Domain (FDTD), Finite Element Method (FEM) and Method of Moments (MoM) may be used for this purpose. This dataset may produce images for different formation and mud characteristics (such as formation resistivity, formation permittivity, mud resistivity and mud permittivity) along with a standoff, where the standoff is defined as the distance of injector electrode 204 (e.g., referring to FIG. 2) to wall of borehole 124 (e.g., referring to FIG. 1). In the simulations, a formation 132 (e.g., referring to FIG. 1) may be modelled with one or more layers, with each layer having different characteristics. The transition between layers may be abrupt or gradual. Noise patterns based on what is observed with downhole tool 102 (e.g., referring to FIG. 1) during measurement operations may be added artificially such as a gradual pattern representing the geometric factor, variations in amplitude levels in an alternating manner to represent striping or a random noise to represent system and environmental noise. Thus, the inputs to the machine learning algorithm (i.e., raw images or corrected images) would be the image samples with added noise and/or imposed artifacts while the target would be the original image without any noise and artifacts. A large portion of these image samples may be used in training (such as 80%) while the rest may be used in validation and testing.

For validation and testing, let each pixel of each image sample of the training dataset be denoted as $I_{i,j}{}^{R,k}$ where k changes from 1 to N, where N is the number of image samples used in training, i and j are the depth and azimuthal indices as mentioned previously and D and A are the total number of points in the depth and azimuthal direction for each image. Additionally, $\overline{I}$ is used to denote that this quantity is a vector containing many image samples. Then, cost function of artificial neural network 1300 may be defined as follows:

$$\arg_{\overline{W}} \min \sum_{k=1}^{N} \sum_{j=1}^{A} \sum_{i=1}^{D} \| T_{i,j}^{R,k} - T_{i,j}^{P,k}(\overline{W}) \| \quad (8)$$

In Equation 8, $T_{i,j}^{P,k}(\overline{W})$ represents outputs 1304 (e.g., referring to FIG. 13) of artificial neural network 1300 for the $k^{th}$ image sample in the training set and $\overline{W}$ is the weight vector of connections 1316 (e.g., referring to FIG. 13) of artificial neural network 1300 over which the cost function is minimized. Cost function may be the mean square error between the prediction of artificial neural network 1300 and a training set as shown in Equation 8. In examples, other forms of error definitions may be used and additional regularization terms to the cost function may be added as well.

In examples, training, validation and testing dataset may be obtained from images processed using traditional techniques that utilize rule-based or expert-based corrections. Rule-based corrections may be defined as being based on signal processing algorithms implemented in software that may automatically perform corrections on the data. These corrections may be based on performing a statistical analysis of the data over a preselected window and may include operations such as equalization of the mean and the variance of different measurement channels (such as measurements coming from different button electrodes) and detection of outlier data with a predetermined threshold. Expert-based correction may be defined as a correction performed manually wherein a user may perform actions similar to the ones described for the rule based correction but in an ad hoc manner and change and optimize corrections based on a user's view of how the data should look like. In most cases, a combination of rule-based and expert-based corrections may be performed where a user may select zones that needs to be corrected and may tune some of the parameters of the correction algorithm such as the window size. User may also adjust the parameters if the results are not satisfactory. In such examples, where the dataset is obtained from traditional processing techniques, samples from a section or sections of a log or logs with high image quality after the processing may be selected. High image quality is defined as a section of the image where over eighty-fiver percent of the artifacts and noise in the image are processed out successfully such that the true underlying features are easily discernible. Determination of high image quality is most easily performed manually by a user, but may be done automatically through a processing algorithm as well. As before, original raw images may be inputs 1302 (e.g., referring to FIG. 13) while the processed images may be the targets for the machine learning algorithms that are being trained. If needed, some additional synthetic noise may be added to the input images to produce more difficult examples that may not be corrected by traditional algorithms properly.

In a variation of the above implementation, if a section of the raw image is clean (i.e., free of artifacts and noise to a significant degree,) it may directly be used as the target of the machine learning algorithm. Input 1302 in this case may be obtained by injecting synthetic noise into the clean raw image as described above.

Once artificial neural network 1300 is produced using a training dataset, a validation dataset not used in training may be used to see how well it predicts their results. This approach prevents overfitting. Overfitting is defined as when artificial neural network 1300 is perfectly optimized for the training set but cannot predict data outside the training set well. For validation, the value of a cost function such as the one in Equation 8 may again be computed on the validation dataset. If the error is high, neural network parameters may be updated in order to improve results. Finally, results may be tested on yet another, independent dataset called the testing dataset to classify the final error. In examples, cross-validation may be used. In cross-validation, datasets are divided into random training, validation and testing parts. This random division may be repeated and the weight vector and the hyperparameters that produces the lowest average error may be used. In some examples, convolutional and pooling layers may be added to artificial neural network 1300 as known in the literature. Since the goal is to preserve the input shape, image may be properly padded to preserve its shape after such operations.

Although artificial neural network 1300 allow regression for multiple points, it may be possible to build a single output neural network in a sequential manner as well. A so called regressor chain may be employed for this purpose. In this case, all inputs 1302 (e.g., referring to FIG. 13) may be used to produce a single processed pixel. Then, this processed pixel (along with the original inputs) may be inputs 1302 to a second artificial neural network, where a second pixel is output 1304 (e.g., referring to FIG. 13). These two processed pixels along with the original inputs 1302 may be input 1302 to a third neural network to output 1304 the third processed pixel and so on. This process may be repeated 576 times for a 24×24 image. Such a regressor chain may also be used for employing machine learning algorithms that may have inherent support for regression with one output. Referring back to artificial neural network 1300, the same idea may be extended to groups of outputs 1304 larger than 1. For example, each artificial neural network 1300 in a regressor chain may have 3 processed pixels as outputs 1304. In examples, after producing the processed images, a second neural network operating on a larger image may be employed to perform some other function. For example, after processing each pad 134 (e.g., referring to FIG. 2) separately for removing noise and artifacts, a second neural network may use the processed results to perform a pad-to-pad equalization.

Figure 15:
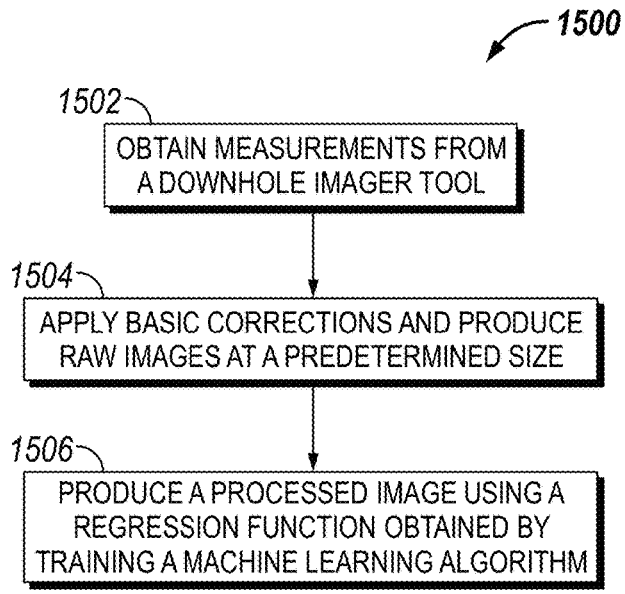
FIG. 15 is a workflow for processing images using a regression function.

FIG. 15 shows a workflow 1500 for processing images using a regression function. Workflow 1500 may begin with block 1502 in which measurements for a depth, or a plurality of depths, are obtained from a downhole tool 102 (e.g., referring to FIG. 1) during measurement operations. The measurements from block 1502 are send to an information handling system 114 (e.g., referring to FIG. 1) for further processing in block 1504. In block 1504, one or more corrections, such as calibration and scaling with a tool constant, may be applied to the measurements from block 1502 to produce a raw image. In block 1506, the raw image, is then used in a regression function obtained by training a supervised machine learning algorithm. This operation may be performed in near real time, whenever enough depth samples needed for the regression function are obtained. Real time logging operations refer to cases where processing is performed in a short enough time frame to enable making decisions on how the logging should proceed without performing costly and time-consuming actions to return the tool string to a previous position or starting over with a new log. Real time decisions could be made within a depth difference of, for example, 1 ft (0.3 meter) or 2 ft (0.6 meter) or 5 ft (1.5 meter) from the depth of the event triggering the decision and this distance may vary based on the specific decision and the properties of borehole 124 (e.g., referring to FIG. 1). Workflow 1500 is performed and repeated as new data arrives for additional measurements taken during measurement operations. Note that, if the number of azimuthal points in an image is less than the total number of azimuthal measurements, multiple images from a single depth point may be processed in parallel. For example, as discussed previously, images may only contain data from a single pad 134 of downhole tool 102 (e.g., referring to FIG. 1) and measurements from each pad 134 may be processed in parallel. Processing may also be performed after the logging (i.e., measurement operations) is completed by dividing the measurements into images as performed by the algorithm. After the processing, an image (i.e., a corrected image) may be displayed directly to a user, it may be stored for later use (for example on information handling system 114) or may be used as a part of additional processing or calculation operations. The corrected image may be utilized to identify formation properties and/or geology of the formation such as formation resistivity, formation permittivity, standoff, layering of the formation, presence of washouts and fractures. Workflow 1500 may be utilized to derive information on formation 132 (e.g., referring to FIG. 1). This information derived from the corrected image guide logging decisions such as adjusting logging speed, determining whether a relog needs to be made, adjusting pad pressure and operating frequencies of the tool, modifying power level, and/or the like.

Figures 16A, 16B, 16C:
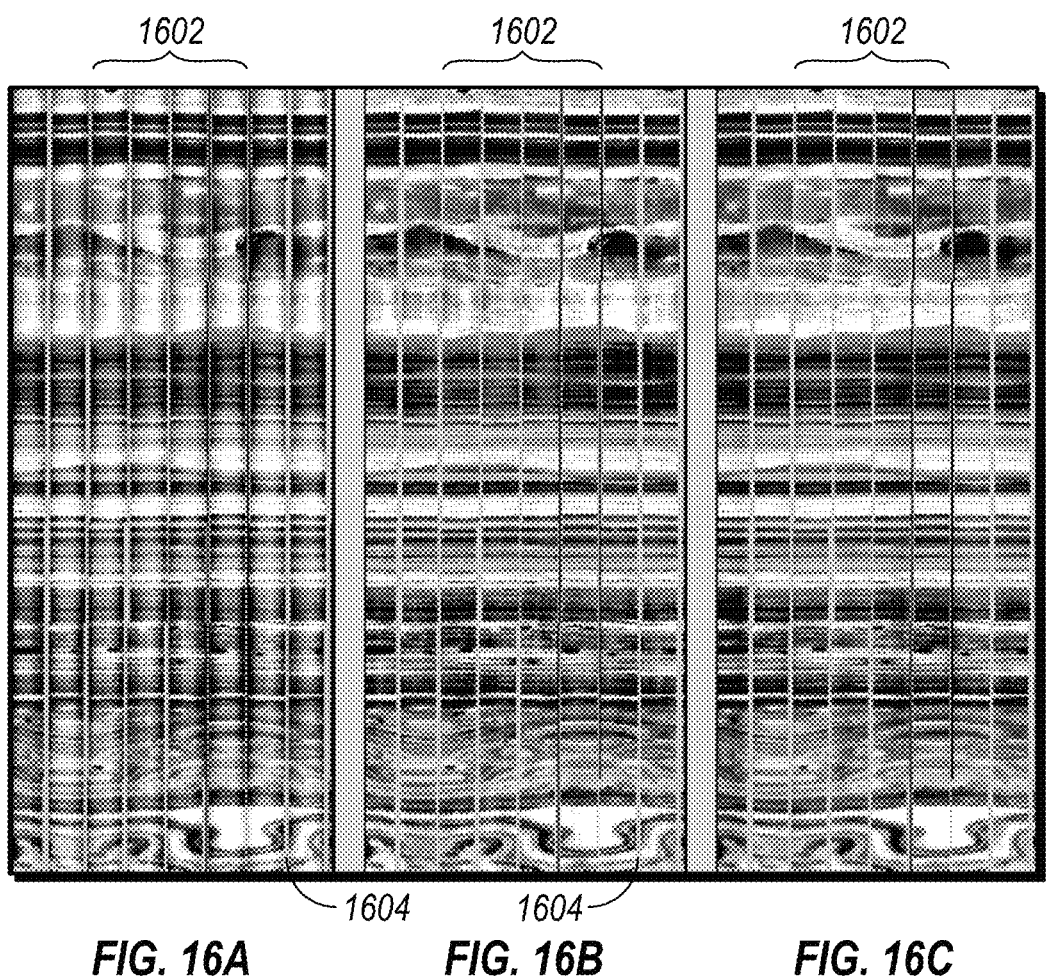
FIGS. 16A-16C illustrate the progression of an image that is corrected using the workflow of FIG. 15.

FIGS. 16A-16C illustrate the implementation of workflow 1500 on a raw image 1600 that utilizes actual measurements from a borehole 124 (e.g., referring to FIG. 1). FIG. 16A shows raw image 1600 acquired using downhole tool 102 (e.g., referring to FIG. 1). For this measurement operations, downhole tool 102 comprises eight pads 134 with twenty-four injector electrodes 204 (e.g., referring to FIG. 2) on each pad 134. A geometric factor 1602 effect is readily observable in image 1600 where for each injector electrodes 204 in the center of pad 134 reads higher than injector electrodes 20F4 on the edge of image 1600. FIG. 16B shows raw image 1600 processed using a window based traditional processing technique while FIG. 16C shows the results after processing with workflow 1500, described above. In this example, workflow 1500 was trained using data from real wells that were cleaned using the traditional processing techniques using 24 pixel by 24 pixel images. (Thus, machine learning method is applied per pad.) As illustrated in FIG. 16C, workflow 1500 is an improvement over current technology in that it removes geometric factor 1602 for a higher resistivity layer on the top section of image 1600. Additionally, workflow 1500 (as illustrated in FIG. 16C) removes striping artifacts 1604 on the lower section of image 1600. Striping artifacts are still seen in FIG. 16B, which utilizes current processing techniques found in current technology.

As noted above, corrected data from workflow 1500 may be utilized for many other downhole operations, processing operations, and/or the like. For example, corrected data may be utilized in pad-to-pad level equalization and automatic dip picking from corrected images. Additionally, corrected data may be used for blending the data, using a blending algorithm, from different corrected image sources (such as real impedivity images and imaginary impedivity images at different frequencies) to produce an image that is least affected by dielectric and standoff effects. Ibis may either be performed using a separate machine learning model trained based on the corrected images or it may be based on a rule based and/or expert user adjusted processing algorithm. Inverting the corrected data, utilizing an inversion algorithm, may allow for decoupling real formation resistivity from formation permittivity and standoff (and thus, again eliminate standoff and dielectric effects.) Mud properties may also be found as a byproduct of inversion. Inversion may be an iterative model-based inversion performed using techniques known in the literature such as Levenberg-Marquardt method. Furthermore, a machine learning algorithm may be applied to the corrected data to perform the same functionality as the inversion and produce images such as formation resistivity images, formation permittivity images and standoff images (along with mud properties such as mud resistivity and mud permittivity.) Note that some of these output images may show a dependence on the frequency so they may need to be calculated at each of the operating frequencies separately.

It should be noted that it is possible to perform blending, machine learning based alternative to inversion or hybrid machine learning/inversion process along with artifact removal in a single step. In this implementation, inputs may be using real and imaginary raw data images at multiple frequencies (obtained, for example, through synthetic means through electromagnetic modelling and injection of noise as previously described) and target will be the image that is desired to be found (for example, formation resistivity, formation permittivity and standoff images that is free of artifacts.) Thus, a machine learning algorithm may be trained such as the neural network shown in FIG. 13 to combine both the artifact removal and the additional desired functionality concurrently.

Although an implementation using artificial neural networks was described, many other machine learning implementations with the same functionality exist. All these algorithms may be trained using a training, validation, and testing dataset to obtain a regression function, and using this regression function to solve for output parameters. Some other examples of the machine learning algorithms include evolutionary algorithms, random forest method and support vector regression method.

In evolutionary algorithms, a large number of candidate regression functions are tested. These candidate functions may include polynomial, exponential, logarithmic and trigonometric expressions among others. Conditional statements and step functions may be tested as well. Initial candidate solutions are seeded randomly within the search space. At each iteration of the algorithm, which is called a generation in analogy with biology, properties of the candidate functions such as the coefficients of the functions or combinations of individual terms that make up the functions are mutated or crossed over. Mutation means a randomly created variation of a property while crossing over means replacing a property of a function with another or combining two or more functions while keeping some or all of the terms of each function. A subgroup of the candidate functions is selected based on a cost function at the end of an iteration. Value of the cost function determines the fitness of the function, again in analogy with the biological phenomenon. Final regression function may be selected when a predetermined fitness threshold is satisfied, or a maximum number of iterations or function evaluations have been performed.

In the random forest approach, regression models are created using a random subset of the training, validation and testing dataset based on a decision-tree approach. Then, these regression functions are combined by averaging them to create a final regression function for the dataset. Decision trees have nodes for each one of the input variables. Branches of the tree represent the possibility of an outcome while the leaves of the tree denote possible outputs. Lay out of the nodes is based on how well each node can classify the target output.

Support vector regression method is a subclass of the support vector machine technique that is used to find a regression function. It is based on minimizing a weight function whose inner product with the input (plus a DC offset) is an approximation of the output.

As discussed above, improvements over current technology may be found in that the systems and methods described above may be performed automatically without requiring a tuning of parameters. It may also be more robust towards error by preventing the corrections to overfit the data. Additionally, the methods and systems do not require any significant buffering of data, so they are more suitable for real time processing as well. The methods and systems may include any of the various features disclosed herein, including one or more of the following statements.

Statement 1. A method for correcting borehole images may comprise acquiring a raw data image of a formation using a downhole tool that takes one or more measurements, processing the raw data image through a machine learning model to form a corrected image, displaying the corrected image, and identifying one or more formation properties based at least in part on the corrected image.

Statement 2. The method of statement 1, wherein the downhole tool is a resistivity imager, and the raw data image represents a resistivity of the formation.

Statement 3. The method of statements 1 or 2, wherein the downhole tool is an impedance imager, and the raw data image represents an impedivity of the formation.

Statement 4. The method of statement 3, wherein the downhole tool operates at one or more frequencies, and the machine learning model is used to correct the raw data image for each of the one or more frequencies.

Statement 5. The method of statement 3, wherein the downhole tool operates at one or more frequencies, and a second machine learning model is used to correct the raw data image for each of the one or more frequencies.

Statement 6. The method of statement 3, wherein the one or more measurements are one or more complex-numbers and the raw data image represent a real and an imaginary component of the one or more measurements, and a second machine learning model is used to correct the raw data image.

Statement 7. The method of any preceding statements 1-3, wherein the machine learning model removes one or more artifacts in the raw data image.

Statement 8. The method of any preceding statements 1-3 or 7, wherein the machine learning model is trained with the raw data image and the corrected image that were processed using rule-based corrections or expert-based corrections.

Statement 9. The method of any preceding statements 1-3, 7, or 8, wherein the machine learning model is trained using the raw data image or the corrected image from a section of a log with high image quality.

Statement 10. The method of any preceding statements 1-3 or 7-9, wherein the machine learning model is trained using the raw data image with a noise or an imposed artifact, or the corrected image with the noise or the imposed artifact.

Statement 11. The method of any preceding statements 1-3 or 7-10, wherein processing the raw data image through the machine learning model occurs at a plurality of depths and the corrected image for each of the plurality of depths is displayed in real-time.

Statement 12. The method of any preceding statements 1-3 or 7-11, wherein processing the raw data image through the machine learning model occurs over a window of data of preset size and the corrected image is displayed in near real-time.

Statement 13. The method of any preceding statements 1-3 or 7-12, further comprising applying a blending algorithm to the corrected image to correct for a dielectric effect and a standoff effect.

Statement 14. The method of any preceding statements 1-3 or 7-13, further comprising adjusting a logging speed, a pad pressure, an operating frequency, or a power level based at least in part on the corrected image.

Statement 15. The method of any preceding statements 1-3 or 7-14, further comprising applying an inversion algorithm to the corrected image to correct for a dielectric effect and a standoff effect.

Statement 16. The method of any preceding statements 1-3 or 7-15, further comprising identifying a geology of the formation based at least in part on the corrected image.

Statement 17. The method of any preceding statements 1-3 or 7-16, further comprising processing the corrected image with a second machine learning model to form a blended image that combines a plurality of corrected images.

Statement 18. The method of any preceding statements 1-3 or 7-17, further comprising training the machine learning model using a plurality of real and imaginary raw data images at one or more frequencies as inputs and a plurality of blended images as an output.

Statement 19. The method of statement 18, wherein the machine learning models forms the corrected image that is corrected for one or more artifacts, a dielectric effect, and a standoff effect.

Statement 20. The method of any preceding statements 1-3 or 7-18, wherein the machine learning model is a neural network or a decision-tree.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for correcting borehole images comprising:
   acquiring a raw data image of a formation using a downhole tool that takes one or more measurements;
   processing the raw data image through a machine learning model to form a corrected image, wherein the machine learning model is determined using a training dataset, wherein one or more inputs of the training dataset comprise an image degrading pattern and azimuthal coverage of a borehole in a subterranean formation;
   displaying the corrected image; and
   identifying one or more formation properties based at least in part on the corrected image.

2. The method of claim 1, wherein the downhole tool is a resistivity imager, and the raw data image represents a resistivity of the formation.

3. The method of claim 1, wherein the downhole tool is an impedance imager, and the raw data image represents an impedivity of the formation.

4. The method of claim 3, wherein the downhole tool operates at one or more frequencies, and the machine learning model is used to correct the raw data image for each of the one or more frequencies.

5. The method of claim 3, wherein the downhole tool operates at one or more frequencies, and a second machine learning model is used to correct the raw data image for each of the one or more frequencies.

6. The method of claim 3, wherein the one or more measurements are one or more complex-numbers and the raw data image represent a real and an imaginary component of the one or more measurements, and a second machine learning model is used to correct the raw data image.

7. The method of claim 1, wherein the machine learning model removes one or more artifacts in the raw data image.

8. The method of claim 1, wherein the machine learning model is trained with the raw data image and the corrected image that were processed using rule-based corrections or expert-based corrections.

9. The method of claim 1, wherein the machine learning model is trained using the raw data image or the corrected image from a section of a log with high image quality.

10. The method of claim 1, wherein the machine learning model is trained using the raw data image with a noise or an imposed artifact, or the corrected image with the noise or the imposed artifact.

11. The method of claim 1, wherein processing the raw data image through the machine learning model occurs at a plurality of depths and the corrected image for each of the plurality of depths is displayed in real-time.

12. The method of claim 1, wherein processing the raw data image through the machine learning model occurs over a window of data of preset size and the corrected image is displayed in near real-time.

13. The method of claim 1, further comprising applying a blending algorithm to the corrected image to correct for a dielectric effect and a standoff effect.

14. The method of claim 1, further comprising adjusting a logging speed, a pad pressure, an operating frequency, or a power level based at least in part on the corrected image.

15. The method of claim 1, further comprising applying an inversion algorithm to the corrected image to correct for a dielectric effect and a standoff effect.

16. The method of claim 1, further comprising identifying a geology of the formation based at least in part on the corrected image.

17. The method of claim 1, further comprising processing the corrected image with a second machine learning model to form a blended image that combines a plurality of corrected images.

18. The method of claim 1, further comprising training the machine learning model using a plurality of real and imaginary raw data images at one or more frequencies as inputs and a plurality of blended images as an output, wherein the machine learning models forms the corrected image that is corrected for one or more artifacts, a dielectric effect, and a standoff effect.

19. The method of claim 1, wherein the machine learning model is a neural network or a decision-tree.

20. A system comprising:
  a borehole imager tool comprising:
    an injector electrode configured to inject current into a borehole; and
    a return electrode configured to receive current from the borehole; and
  an information handling system configured to:
    acquire a raw data image of a formation using a downhole tool that takes one or more measurements, wherein the raw data image is determined using a training dataset with known inputs and outputs, wherein the inputs of the training dataset are based in part on added noise patterns and azimuthal coverage of a borehole in a subterranean formation;
  process the raw data image through a regression function using the training dataset to form a corrected image;
  display the corrected image; and
  identify one or more formation properties based at least in part on the corrected image.

* * * * *